United States Patent
Hitomi et al.

(10) Patent No.: US 9,699,194 B2
(45) Date of Patent: *Jul. 4, 2017

(54) RULE-BASED APPLICATION ACCESS MANAGEMENT

(71) Applicant: Numecent Holdings, Inc., Irvine, CA (US)

(72) Inventors: Arthur S. Hitomi, Huntington Beach, CA (US); Robert Tran, Anaheim, CA (US); Peter J. Kammer, Sunnyvale, CA (US); Doug Pfiffner, Anaheim Hills, CA (US); Huy Nguyen, Irvine, CA (US)

(73) Assignee: Numecent Holdings, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,326

(22) Filed: Dec. 23, 2016

(65) Prior Publication Data

US 2017/0111361 A1    Apr. 20, 2017

Related U.S. Application Data

(63) Continuation of application No. 15/150,874, filed on May 10, 2016, now Pat. No. 9,571,501, which is a
(Continued)

(51) Int. Cl.
*H04L 29/06*    (2006.01)
*G06F 21/62*    (2013.01)
(Continued)

(52) U.S. Cl.
CPC .............. *H04L 63/10* (2013.01); *G06F 9/468* (2013.01); *G06F 21/6218* (2013.01);
(Continued)

(58) Field of Classification Search
CPC ....... G06F 21/445; H04L 63/08; H04L 63/00; H04L 63/061
See application file for complete search history.

(56) References Cited

U.S. PATENT DOCUMENTS 4,796,220 A    1/1989    Wolfe
5,063,500 A    11/1991    Shorter
(Continued)

FOREIGN PATENT DOCUMENTS

EP    0813325    12/1997
EP    0658837    6/2000
(Continued)

OTHER PUBLICATIONS

Bailey, Peter et al., "Chart of Darkness: Mapping a Large Intranet," Dept. of Computer Science, FEIT, The Australian National University, Canberra ACT 0200, Australia, pp. 1-23, Nov. 11, 1999 [retrieved online at http://research.microsoft.com/en-us/um/people/nickcr/pubs/bailey_tr00.pdf].
(Continued)

*Primary Examiner* — Izunna Okeke
(74) *Attorney, Agent, or Firm* — Sheppard, Mullin, Richter & Hampton LLP

(57) ABSTRACT

A container that manages access to protected resources using rules to intelligently manage them includes an environment having a set of software and configurations that are to be managed. A rule engine, which executes the rules, may be called reactively when software accesses protected resources. The engine uses a combination of embedded and configurable rules. It may be desirable to assign and manage rules per process, per resource (e.g. file, registry, etc.), and per user. Access rules may be altitude-specific access rules.

14 Claims, 13 Drawing Sheets

Related U.S. Application Data continuation of application No. 14/712,339, filed on May 14, 2015, now Pat. No. 9,380,063, which is a continuation of application No. 14/324,571, filed on Jul. 7, 2014, now Pat. No. 9,054,963, which is a continuation of application No. 13/594,041, filed on Aug. 24, 2012, now Pat. No. 8,782,778, which is a continuation of application No. 11/977,187, filed on Oct. 23, 2007, now Pat. No. 8,261,345.

(60) Provisional application No. 60/853,941, filed on Oct. 23, 2006.

(51) Int. Cl.
  *G06F 9/46* (2006.01)
  *H04L 12/24* (2006.01)

(52) U.S. Cl.
  CPC .......... *H04L 41/145* (2013.01); *H04L 63/108* (2013.01); *G06F 2221/2141* (2013.01)

(56) References Cited

U.S. PATENT DOCUMENTS

| | | |
|---|---|---|
| 5,109,413 A | 4/1992 | Comerford et al. |
| 5,210,850 A | 5/1993 | Kelly et al. |
| 5,293,556 A | 3/1994 | Hill et al. |
| 5,442,791 A | 8/1995 | Wrabetz et al. |
| 5,495,411 A | 2/1996 | Ananda |
| 5,547,202 A | 8/1996 | Tsumura |
| 5,548,645 A | 8/1996 | Ananda |
| 5,652,887 A | 7/1997 | Dewey et al. |
| 5,666,293 A | 9/1997 | Metz et al. |
| 5,696,965 A | 12/1997 | Dedrick |
| 5,701,427 A | 12/1997 | Lathrop |
| 5,706,440 A | 1/1998 | Compliment et al. |
| 5,715,403 A | 2/1998 | Stefik |
| 5,764,906 A | 6/1998 | Edelstein et al. |
| 5,765,152 A | 6/1998 | Erickson |
| 5,768,528 A | 6/1998 | Stumm |
| 5,768,539 A | 6/1998 | Metz et al. |
| 5,771,354 A | 6/1998 | Crawford |
| 5,778,395 A | 7/1998 | Whiting et al. |
| 5,790,753 A | 8/1998 | Krishnamoorthy et al. |
| 5,805,809 A | 9/1998 | Singh et al. |
| 5,809,144 A | 9/1998 | Sirbu et al. |
| 5,812,881 A | 9/1998 | Ku et al. |
| 5,818,711 A | 10/1998 | Schwabe et al. |
| 5,822,537 A | 10/1998 | Katseff et al. |
| 5,835,722 A | 11/1998 | Bradshaw et al. |
| 5,838,910 A | 11/1998 | Domenikos et al. |
| 5,855,020 A | 12/1998 | Kirsch |
| 5,874,986 A | 2/1999 | Gibbon et al. |
| 5,878,425 A | 3/1999 | Redpath |
| 5,881,229 A | 3/1999 | Singh et al. |
| 5,881,232 A | 3/1999 | Cheng et al. |
| 5,892,915 A | 4/1999 | Duso et al. |
| 5,892,953 A | 4/1999 | Bhagria et al. |
| 5,895,454 A | 4/1999 | Harrington |
| 5,895,471 A | 4/1999 | King et al. |
| 5,901,315 A | 5/1999 | Edwards et al. |
| 5,903,721 A | 5/1999 | Sixtus |
| 5,903,732 A | 5/1999 | Reed et al. |
| 5,903,892 A | 5/1999 | Hoffert et al. |
| 5,905,868 A | 5/1999 | Baghai et al. |
| 5,905,990 A | 5/1999 | Inglett |
| 5,909,545 A | 6/1999 | Frese et al. |
| 5,911,043 A | 6/1999 | Duffy et al. |
| 5,918,015 A | 6/1999 | Suzuki et al. |
| 5,923,885 A | 7/1999 | Johnson |
| 5,925,126 A | 7/1999 | Hsieh et al. |
| 5,929,849 A | 7/1999 | Kikinis |
| 5,931,907 A | 8/1999 | Davies et al. |
| 5,933,603 A | 8/1999 | Vahalia et al. |
| 5,933,822 A | 8/1999 | Braden-Harder et al. |
| 5,943,424 A | 8/1999 | Berger et al. |
| 5,948,062 A | 9/1999 | Tzelnic et al. |
| 5,948,065 A | 9/1999 | Eilert et al. |
| 5,949,877 A | 9/1999 | Traw et al. |
| 5,953,506 A | 9/1999 | Kalra et al. |
| 5,956,717 A | 9/1999 | Kraay et al. |
| 5,960,411 A | 9/1999 | Hartman et al. |
| 5,960,439 A | 9/1999 | Hamner et al. |
| 5,961,586 A | 10/1999 | Pedersen |
| 5,961,591 A | 10/1999 | Jones et al. |
| 5,963,444 A | 10/1999 | Shidara et al. |
| 5,963,944 A | 10/1999 | Adams |
| 5,973,696 A | 10/1999 | Agranat et al. |
| 5,987,454 A | 11/1999 | Hobbs |
| 6,003,065 A | 12/1999 | Yan et al. |
| 6,003,095 A | 12/1999 | Pekowski et al. |
| 6,014,686 A | 1/2000 | Elnozahy et al. |
| 6,018,619 A | 1/2000 | Allard et al. |
| 6,026,166 A | 2/2000 | LeBourgeois |
| 6,028,925 A | 2/2000 | Van Berkum et al. |
| 6,038,379 A | 3/2000 | Fletcher et al. |
| 6,038,610 A | 3/2000 | Belfiore et al. |
| 6,047,323 A | 4/2000 | Krause |
| 6,049,835 A | 4/2000 | Gagnon |
| 6,061,738 A | 5/2000 | Osaku et al. |
| 6,065,043 A | 5/2000 | Domenikos et al. |
| 6,076,104 A | 6/2000 | McCue |
| 6,081,842 A | 6/2000 | Shachar et al. |
| 6,085,186 A | 7/2000 | Christianson et al. |
| 6,085,193 A | 7/2000 | Malkin et al. |
| 6,088,705 A | 7/2000 | Lightstone |
| 6,092,194 A | 7/2000 | Touboul |
| 6,094,649 A | 7/2000 | Bowen et al. |
| 6,099,408 A | 8/2000 | Schneier et al. |
| 6,101,482 A | 8/2000 | Diangelo et al. |
| 6,101,491 A | 8/2000 | Woods |
| 6,101,537 A | 8/2000 | Edelstein et al. |
| 6,108,420 A | 8/2000 | Larose et al. |
| 6,115,741 A | 9/2000 | Domenikos et al. |
| 6,138,271 A | 10/2000 | Keeley |
| 6,154,878 A | 11/2000 | Saboff |
| 6,157,948 A | 12/2000 | Inoue et al. |
| 6,173,330 B1 | 1/2001 | Guo et al. |
| 6,185,608 B1 | 2/2001 | Hon et al. |
| 6,192,398 B1 | 2/2001 | Hunt |
| 6,192,408 B1 | 2/2001 | Vahalia et al. |
| 6,195,694 B1 | 2/2001 | Chen et al. |
| 6,212,640 B1 | 4/2001 | Abdelnur et al. |
| 6,219,693 B1 | 4/2001 | Napolitano et al. |
| 6,226,665 B1 | 5/2001 | Deo et al. |
| 6,253,234 B1 | 6/2001 | Hunt et al. |
| 6,275,470 B1 | 8/2001 | Ricciulli |
| 6,275,496 B1 | 8/2001 | Burns et al. |
| 6,278,992 B1 | 8/2001 | Curtis et al. |
| 6,282,712 B1 | 8/2001 | Davis et al. |
| 6,298,356 B1 | 10/2001 | Jawahar et al. |
| 6,301,685 B1 | 10/2001 | Shigeta |
| 6,311,221 B1 | 10/2001 | Raz et al. |
| 6,330,561 B1 | 12/2001 | Cohen et al. |
| 6,343,287 B1 | 1/2002 | Kumar et al. |
| 6,347,398 B1 | 2/2002 | Parthasarathy et al. |
| 6,356,946 B1 | 3/2002 | Clegg et al. |
| 6,369,467 B1 | 4/2002 | Noro |
| 6,370,686 B1 | 4/2002 | Delo et al. |
| 6,374,402 B1 | 4/2002 | Schmeidler et al. |
| 6,385,596 B1 | 5/2002 | Wiser et al. |
| 6,385,696 B1 | 5/2002 | Doweck et al. |
| 6,389,467 B1 | 5/2002 | Eyal |
| 6,418,554 B1 | 7/2002 | Delo et al. |
| 6,418,555 B2 | 7/2002 | Mohammed |
| 6,418,556 B1 | 7/2002 | Bennington et al. |
| 6,424,991 B1 | 7/2002 | Gish |
| 6,425,017 B1 | 7/2002 | Dievendorff et al. |
| 6,449,688 B1 | 9/2002 | Peters et al. |
| 6,453,334 B1 | 9/2002 | Vinson et al. |
| 6,457,076 B1 | 9/2002 | Cheng et al. |
| 6,508,709 B1 | 1/2003 | Karmarkar |
| 6,510,458 B1 | 1/2003 | Berstis et al. |
| 6,510,462 B2 | 1/2003 | Blumenau |

(56) References Cited

U.S. PATENT DOCUMENTS

| | | |
|---|---|---|
| 6,510,466 B1 | 1/2003 | Cox et al. |
| 6,524,017 B2 | 2/2003 | Lecocq et al. |
| 6,574,618 B2 | 6/2003 | Eylon et al. |
| 6,584,507 B1 | 6/2003 | Bradley et al. |
| 6,587,857 B1 | 7/2003 | Carothers et al. |
| 6,594,682 B2 | 7/2003 | Peterson et al. |
| 6,598,125 B2 | 7/2003 | Romm |
| 6,601,103 B1 | 7/2003 | Goldschmidt et al. |
| 6,605,956 B2 | 8/2003 | Farnworth et al. |
| 6,609,114 B1 | 8/2003 | Gressel et al. |
| 6,611,812 B2 | 8/2003 | Hurtado et al. |
| 6,622,137 B1 | 9/2003 | Ravid et al. |
| 6,622,171 B2 | 9/2003 | Gupta et al. |
| 6,636,961 B1 | 10/2003 | Braun et al. |
| 6,660,110 B1 | 12/2003 | Gayda |
| 6,687,745 B1 | 2/2004 | Franco et al. |
| 6,694,510 B1 | 2/2004 | Willems |
| 6,697,869 B1 | 2/2004 | Mallart et al. |
| 6,711,619 B1 | 3/2004 | Chandramohan et al. |
| 6,732,179 B1 | 5/2004 | Brown et al. |
| 6,735,631 B1 | 5/2004 | Oehrke et al. |
| 6,757,708 B1 | 6/2004 | Craig et al. |
| 6,757,894 B2 | 6/2004 | Eylon et al. |
| 6,763,370 B1 | 7/2004 | Schmeidler et al. |
| 6,772,209 B1 | 8/2004 | Chernock et al. |
| 6,775,779 B1 | 8/2004 | England et al. |
| 6,779,179 B1 | 8/2004 | Romm et al. |
| 6,785,768 B2 | 8/2004 | Peters et al. |
| 6,785,865 B1 | 8/2004 | Cote et al. |
| 6,801,507 B1 | 10/2004 | Humpleman et al. |
| 6,810,525 B1 | 10/2004 | Safadi et al. |
| 6,816,909 B1 | 11/2004 | Chang et al. |
| 6,816,950 B2 | 11/2004 | Nichols |
| 6,832,222 B1 | 12/2004 | Zimowski |
| 6,836,794 B1 | 12/2004 | Lucowsky et al. |
| 6,854,009 B1 | 2/2005 | Hughes |
| 6,891,740 B2 | 5/2005 | Williams |
| 6,918,113 B2 | 7/2005 | Patel et al. |
| 6,925,495 B2 | 8/2005 | Hedge et al. |
| 6,938,096 B1 | 8/2005 | Greschler et al. |
| 6,959,320 B2 | 10/2005 | Shah et al. |
| 6,970,866 B1 | 11/2005 | Pravetz et al. |
| 7,028,305 B2 | 4/2006 | Schaefer et al. |
| 7,043,524 B2 | 5/2006 | Shah et al. |
| 7,051,315 B2 | 5/2006 | Artzi et al. |
| 7,062,567 B2 | 6/2006 | Benitez et al. |
| 7,096,253 B2 | 8/2006 | Vinson et al. |
| 7,112,138 B2 | 9/2006 | Hedrick et al. |
| 7,191,441 B2 | 3/2007 | Abbott et al. |
| 7,192,352 B2 | 3/2007 | Walker et al. |
| 7,197,516 B1 | 3/2007 | Hipp et al. |
| 8,752,128 B2 | 6/2014 | Hitomi et al. |
| 2001/0003828 A1 | 6/2001 | Peterson et al. |
| 2001/0014878 A1 | 8/2001 | Mitra et al. |
| 2001/0034736 A1 | 10/2001 | Eylon et al. |
| 2001/0037399 A1 | 11/2001 | Eylon et al. |
| 2001/0037400 A1 | 11/2001 | Raz et al. |
| 2001/0044850 A1 | 11/2001 | Raz et al. |
| 2001/0044851 A1 | 11/2001 | Rothman et al. |
| 2002/0015106 A1 | 2/2002 | Taylor, Jr. |
| 2002/0019864 A1 | 2/2002 | Mayer |
| 2002/0042833 A1 | 4/2002 | Hendler et al. |
| 2002/0057893 A1 | 5/2002 | Wood et al. |
| 2002/0059402 A1 | 5/2002 | Belanger |
| 2002/0065848 A1 | 5/2002 | Walker et al. |
| 2002/0078170 A1 | 6/2002 | Brewer et al. |
| 2002/0078203 A1 | 6/2002 | Greschler et al. |
| 2002/0083183 A1 | 6/2002 | Pujare et al. |
| 2002/0083187 A1 | 6/2002 | Sim et al. |
| 2002/0087717 A1 | 7/2002 | Artzi et al. |
| 2002/0087883 A1 | 7/2002 | Wohlgemuth et al. |
| 2002/0087963 A1 | 7/2002 | Eylon et al. |
| 2002/0091763 A1 | 7/2002 | Shah et al. |
| 2002/0116476 A1 | 8/2002 | Eyal et al. |
| 2002/0133491 A1 | 9/2002 | Sim et al. |
| 2002/0138640 A1 | 9/2002 | Raz et al. |
| 2002/0156911 A1 | 10/2002 | Croman et al. |
| 2002/0157089 A1 | 10/2002 | Patel et al. |
| 2003/0004882 A1 | 1/2003 | Holler et al. |
| 2003/0009538 A1 | 1/2003 | Shah et al. |
| 2003/0014466 A1 | 1/2003 | Berger et al. |
| 2003/0056112 A1 | 3/2003 | Vinson et al. |
| 2003/0105816 A1 | 6/2003 | Goswami |
| 2003/0140160 A1 | 7/2003 | Raz et al. |
| 2004/0036722 A1 | 2/2004 | Warren |
| 2004/0128342 A1 | 7/2004 | Maes et al. |
| 2004/0133657 A1 | 7/2004 | Smith et al. |
| 2004/0199566 A1 | 10/2004 | Carlson et al. |
| 2004/0230784 A1 | 11/2004 | Cohen |
| 2004/0230971 A1 | 11/2004 | Rachman et al. |
| 2004/0267813 A1 | 12/2004 | Rivers-Moore et al. |
| 2004/0268361 A1 | 12/2004 | Schaefer |
| 2005/0010607 A1 | 1/2005 | Parker et al. |
| 2005/0010670 A1 | 1/2005 | Greschler et al. |
| 2005/0091534 A1 | 4/2005 | Nave et al. |
| 2005/0114472 A1 | 5/2005 | Tan |
| 2005/0193139 A1 | 9/2005 | Vinson et al. |
| 2006/0010074 A1 | 1/2006 | Zeitsiff et al. |
| 2006/0031165 A1 | 2/2006 | Nave et al. |
| 2006/0031679 A1* | 2/2006 | Soltis, Jr. ............ G06F 21/6281 713/182 |
| 2006/0047716 A1 | 3/2006 | Keith Jr. |
| 2006/0048136 A1 | 3/2006 | Vries et al. |
| 2006/0106770 A1 | 5/2006 | Vries |
| 2006/0123185 A1 | 6/2006 | de Vries et al. |
| 2006/0136389 A1 | 6/2006 | Cover et al. |
| 2006/0224590 A1 | 10/2006 | Boozer et al. |
| 2007/0038642 A1 | 2/2007 | Durgin et al. |
| 2007/0043550 A1 | 2/2007 | Tzruya |
| 2007/0067435 A1 | 3/2007 | Landis et al. |
| 2007/0074223 A1 | 3/2007 | Lescouet et al. |
| 2007/0126749 A1 | 6/2007 | Tzruya et al. |
| 2007/0129146 A1 | 6/2007 | Tzruya et al. |
| 2007/0129990 A1 | 6/2007 | Tzruya et al. |
| 2007/0130292 A1 | 6/2007 | Tzruyz et al. |
| 2007/0168309 A1 | 7/2007 | Tzruya et al. |
| 2007/0283361 A1 | 12/2007 | Blanchet et al. |
| 2008/0052716 A1 | 2/2008 | Theurer |

FOREIGN PATENT DOCUMENTS

| | | |
|---|---|---|
| EP | 1020824 | 7/2000 |
| EP | 1143349 | 10/2001 |
| WO | 9840993 | 9/1998 |
| WO | 9850853 | 11/1998 |
| WO | 9957863 | 11/1999 |
| WO | 9960458 | 11/1999 |
| WO | 0004681 | 1/2000 |
| WO | 0031657 | 6/2000 |
| WO | 0031672 | 6/2000 |
| WO | 0056028 | 9/2000 |
| WO | 0127805 | 4/2001 |
| WO | 0146856 | 6/2001 |
| WO | 0244840 | 6/2002 |
| WO | 2006022745 | 3/2006 |
| WO | 2006047133 | 5/2006 |
| WO | 2006055445 | 5/2006 |
| WO | 2006102532 | 9/2006 |
| WO | 2006102621 | 9/2006 |

OTHER PUBLICATIONS

Boneh, Dan et al., "An Attack on RSA Given a Small Fraction of the Private Key Bits," Advances in Cryptology—ASIACRYPT '98, Lecture Notes in Computer Science, vol. 1514, pp. 25-34, Oct. 1998 [retrieved online at http://download.springer.com/static/pdf/450/chp%253A10.1007%252F3-540-49649-1_3.pdf?auth66=1394831295_318c7a44939193b5a2aff612b2a047ac&ext=.pdf].

Brin, Sergey et al., "The Anatomy of a Large-Scale Hypertextual Web Search Engine," Proceedings of the Seventh International

(56) References Cited

OTHER PUBLICATIONS

World Wide Web Conference, pp. 107-117, Apr. 1998 [retrieved online at http://ilpubs.stanford.edu:8090/361/1/1998-8.pdf].

Chu, Yang-Hua et al., "REFEREE: Trust Management for Web Applications," Proceedings of the Sixth International World Wide Web Conference, 1997, retrieved online on Jun. 15, 2006 at http://www.si.umich.edu/~presnick/papers/Referee/www6-referee.html.

Faupel, Matthew, "Status of Industry Work on Signed Mobile Code," Joint European Networking Conference (JENC), May 1997, 313-1-313-8.

Fiedler, David et al., "UNIX System V. Release 4 Administration," Second Edition, 1991, 1-13, 37-116, 152-153, 175-200, 291-312, Hayden Books, Carmel, Indiana, USA.

George, Binto et al., "Secure Transaction Processing in Firm Real-Time Database Systems," SIGMOD International Conference on Management of Data 1997, 462-473, V26, Issue 2, Association of Computing Machinery (ACM) Press, Tucson, Arizona, United States, May 13, 1997.

Gralla, Preston, "How the Internet Works: Chapter 44—Shopping on the Internet," IEEE Personal Communications, Aug. 1999, 260-67, QUE—A division of Macmillan Computer Publishing, Millennium Edition.

Microsoft Corp., "Computer Dictionary," 3rd edition, 1997, pp. 119 & 305, Microsoft Press.

Microsoft Corp., "Understanding Universal Plug and Play," pp. 1-39, Feb. 2000.

Morrow, Brian et al., "Indexing Within—The Lost Gold Within the Enterprise" Endeavors Technology, Aug. 22, 2000, pp. 1-6.

Mullender, Sape J. et al., "Amoeba:A Distributed Operating System for the 1990's," Computer Magazine, May 1990, 44-53, 23(5).

Nakayoshi et al., "A Secure Private File System with Minimal System Administration," Communications, Computers and Signal Processing, 1997 IEEE Pacific Rim Conference, 251-255, vol. 1.

O'Mahony, Donal, "Security Considerations in a Network Management Environment," 1994, 12-17, vol. 8, IEEE, USA.

Pyarali, Irfan et al., "Design and Performance of an Object-Oriented Framework for High-Speed Electronic Medical Imaging," Fall 1996, Computing Systems Journal, 331-375, vol. 9, http://www.cs.wustl.edu/~schmidt/PDF/COOTS-96.pdf.

Rappaport, Avi, "Robots & Spiders & Crawlers: How Web and Intranet Search Engines Follow Links to Build Indexes," Infoseek Software, pp. 1-38 (Oct. 1999).

Reinhardt, Robert B., "An Architectural Overview of UNIX Network Security," ARINC Research Corporation, Sep. 19, 1992, retrieved online on Jun. 15, 2006 at http://www.clusit.it/whitepapers/unixnet.pdf.

Sirbu, Marvin et al., "Netbill: An Internet Commerce System Optimized for Network-Delivered Services," IEEE Personal Communications, 2(4):34-39, Aug. 1995.

Tardo, Joseph et al., "Mobile Agent Security and Telescript," 4th International Conference of the IEEE Computer Society (IEEE CompCon1996), Feb. 1996.

* cited by examiner

RULE-BASED APPLICATION ACCESS MANAGEMENT

CROSS-REFERENCE TO RELATED APPLICATIONS

This application is a continuation of U.S. patent application Ser. No. 15/150,874, filed May 10, 2016, which is a continuation of U.S. patent application Ser. No. 14/712,339, filed May 14, 2015, now U.S. Pat. No. 9,380,063, which is a continuation of U.S. patent application Ser. No. 14/324,571, filed Jul. 7, 2014, now U.S. Pat. No. 9,054,963, which is a continuation of U.S. patent application Ser. No. 13/594,041, filed Aug. 24, 2012, now U.S. Pat. No. 8,782,778, which is a continuation of U.S. patent application Ser. No. 11/977,187, filed Oct. 23, 2007, now U.S. Pat. No. 8,261,345, which claims the benefit of U.S. Provisional Patent Application No. 60/853,941, filed Oct. 23, 2006.

Further, this application is related to U.S. patent application Ser. No. 14/296,342, filed Jun. 4, 2014, now U.S. Pat. No. 9,054,962, which is a continuation of U.S. patent application Ser. No. 13/594,546, filed Aug. 24, 2012, now U.S. Pat. No. 8,752,128, which is a division of U.S. Ser. No. 11/977,187, filed Oct. 23, 2007, now U.S. Pat. No. 8,261,345, which claims the benefit of U.S. Application No. 60/853,941, filed Oct. 23, 2006, all of which are incorporated by reference herein.

BACKGROUND

Software programs, as designed and implemented by their authors, will access operating system resources and other applications to add, create, modify, and execute them. Periodically, there are changes made to the program's runtime environment, usually but not limited to the operating system or another application, configuration, or a combination of these. These changes affect the software program's environment.

Changes to a program's environment can affect not only the program, but other programs as well. Thus, it may be desirable to ensure that controls are in place to avoid influencing the operation of a first application when changes are made by a second application. To accomplish this goal, administrators may use, for example, one of the following methods 1) contain the software to a dedicated machine 2) contain the software to an OS through a virtual machine, 3) sandbox the application. Approaches 1) and 2) require additional resources. Approach 3) overly restricts the application.

Virtualizing a software application does not work particularly well for many types of software applications, including by way of example but not limitation productivity applications. DLLs, fonts, the registry itself are typically intended to be viewed by many or all applications running on a machine. For example, with respect to Microsoft Word® and Adobe Acrobat®, Acrobat may include code to put a toolbar in Word. If Word is completely virtualized, then Acrobat cannot add the toolbar.

These and other issues are addressed, resolved, and/or reduced using techniques described herein. The foregoing examples of the related art and limitations related therewith are intended to be illustrative and not exclusive. Other limitations of the related art will become apparent to those of skill in the relevant art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A software container that manages access to protected resources using rules to intelligently manage them includes an environment having a set of software and configurations that are to be managed. A rule engine, which executes the rules, may be called reactively when software accesses protected resources. The engine may use a combination of embedded and configurable rules which can include, but are not limited to, file, user and process access control lists (ACLs), software handlers, and file and resource overlays. The container, if necessary, can create virtual images of resources to manage separate views of the container resources.

It may be desirable to assign and manage rules per process, per resource (e.g. file, registry, etc.), and per user. In a non-limiting embodiment, a main process and child processes of a software application may be assigned the same set of rules, which allow these processes full access to the application resources. Alternatively, processes, especially those executing outside the application's process tree, can be individually assigned rules that allow, restrict, or deny access to individual resources of the application. Same or different users may or may not be allowed to have same or different sets of rules for the same or different applications at the same or different times of usage. These sets of rules should be communicated securely to the user's machine using encryption.

Access rules may be altitude-specific.

BRIEF DESCRIPTION OF THE DRAWINGS

Embodiments of the present invention are illustrated in the figures. However, the embodiments and figures are illustrative rather than limiting; they provide examples of the invention.

DETAILED DESCRIPTION

Figure 1:
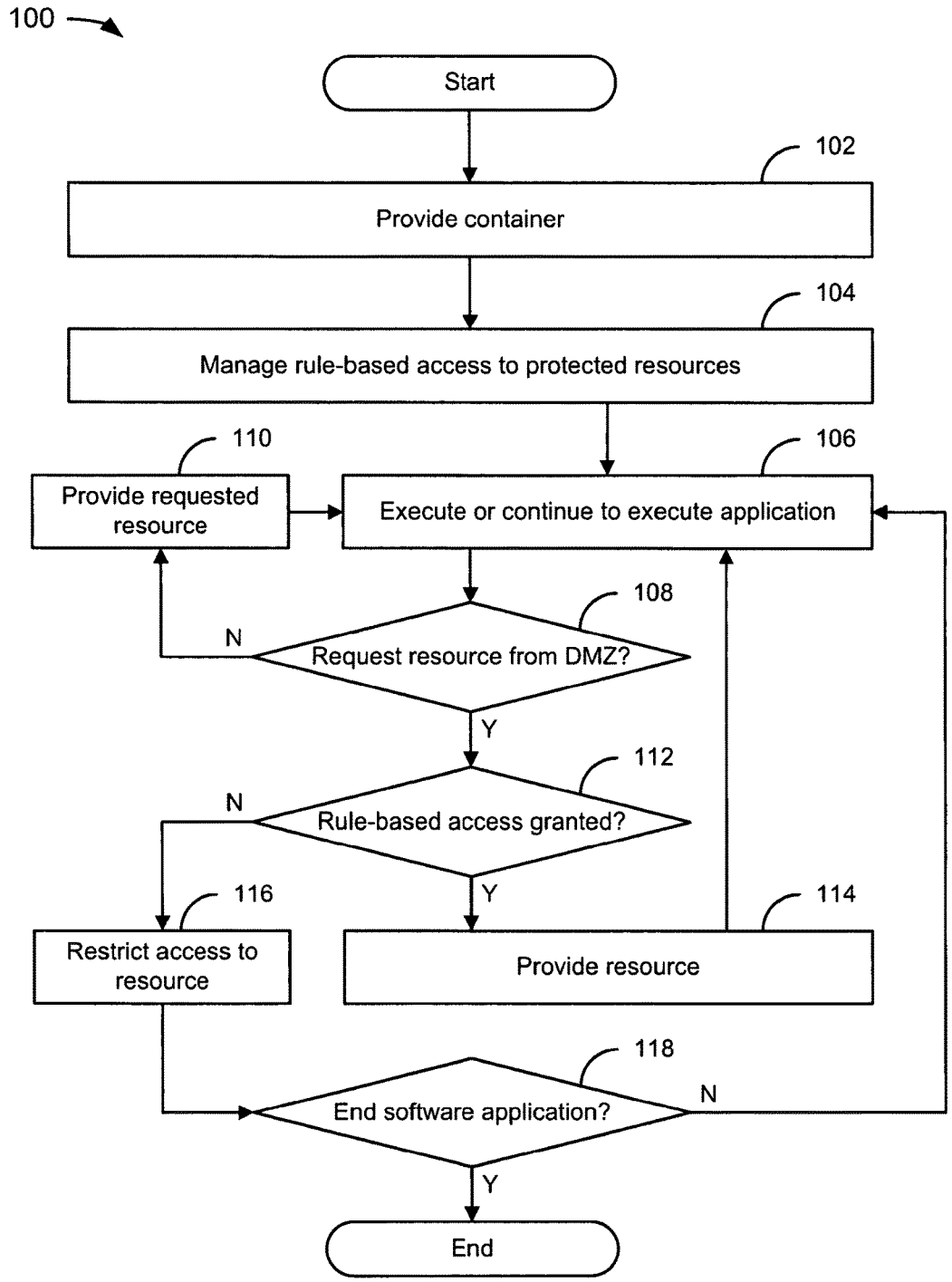
FIG. 1 depicts a flowchart of an example of a method for rule-based access to resources associated with a container.

In the following description, for the purposes of explanation, numerous specific details are set forth in order to provide a thorough understanding of the present invention. It will be apparent, however, to one skilled in the relevant art that the present invention may be practiced without one or more of these specific details or in combination with other components or process steps. In other instances, well-known structures and devices are shown in block diagram form in order to avoid unnecessarily obscuring the present invention.

A technique for application access management involves running an application inside a container. The container may virtualize the application. Advantageously, the container can also partially virtualize an application or applications by "poking holes in the container" to allow other applications to access resources located in the container. Alternatively, the container may allow the application to run as if it was not inside a container ("non-virtualized") by giving full access to all files within the container. Using techniques described herein, an administrator could decide on how much virtualization to allow for a particular application, which could range from complete virtualization to complete non-virtualization.

As a specific implementation, OpenOffice needs to be able to tell other applications where, for example, OpenOffice Writer files are located to enable the applications to access the Writer files. If OpenOffice is fully virtualized, then the Writer files may be hidden from other applications. If OpenOffice is not virtualized at all, then various applications that change the system environment could adversely impact OpenOffice, or vice versa. However, if OpenOffice is partially virtualized, in that the system knows where certain files are located, the system can set up a "DMZ" in which, for example, file requests from outside applications can be serviced for selected files. Partial virtualization can grant the benefits of both virtualization, and non-virtualization.

For the purposes of this application, it is assumed that a container serves to virtualize an application, and the container can have holes poked into it such that specific files can be accessed by applications outside of the container. Thus, a container is capable of virtualizing an application (if no holes are poked through the container), partially virtualizing the application (if some holes are poked through the container), or allowing the application to run without any virtualization (if holes are poked through the container to every resource in the container).

For the purposes of this application, a DMZ is a virtual area in which resource requests of resources kept in or associated with a container are honored or refused. The resource requests may succeed if virtualization associated with a relevant container does not include the requested resource (e.g., the resource is not virtualized at all), or if the requestor is allowed to pierce the container (e.g., the requestor is allowed access to the resource through a hole poked in the container). It should be noted that in some cases in this application, for the purpose of example, it is assumed that a requestor requests a resource that exists, and that the rule-based determination as to whether to honor the request is made at the DMZ. The rule-based determination can be affirmative or negative depending upon the requestor.

For the purposes of this application, a requestor can be a user and/or a process. In an embodiment, the requestor is a user. In another embodiment, the requestor is a process. In another embodiment, the requestor is a user/process (e.g., rule-based decisions to grant or deny access to a resource consider both the requesting user and the requesting process).

FIG. 1 depicts a flowchart 100 of an example of a method for rule-based access to resources associated with an application. In the example of FIG. 1, the flowchart 100 starts at module 102 with providing a container, such as a software container. The container may include, for example, one or more applications, including one or more resources (such as, by way of example but not limitation, files) associated with the applications. The applications may include executable files that are executed "inside" the container. In an embodiment, one or more of the applications runs as the flowchart 100 continues from start to end. In another embodiment, a process associated with the applications is located in memory as the flowchart 100 continues from start to end. In other embodiments, a process associated with the applications may or may not consume memory resources, and a application may or may not be running, as the flowchart 100 continues from start to end. Resources may include firmware resources, hardware resources, or software components, such as drivers, associated with the firmware or hardware resources.

In the example of FIG. 1, the flowchart 100 continues to module 104 where rule-based access to protected resources is managed. Rule-based access management can facilitate use of different runtime models including but not limited to the following: sand-boxing, overlaying, and hybrid. In the sand-boxing model, each application executes in a protected and non-integrated environment, where resources of the application are not publicly visible to the system. In the overlaying model, each application appears publicly in the system as if it were physically installed. Resources of the application that come into conflicts with those of the system will be resolved such that newer resources take precedence over older ones. In the hybrid model, each application also appears publicly in the system as if it is physically installed. Conflicting resources are not resolved, however, but are restricted to access by appropriate processes only. This may let incompatible versions of the same application run side-by-side without interferences.

In the example of FIG. 1, the flowchart 100 continues to module 106 with executing an application. The application may be associated with the container introduced in module 102, a different container, or no container. The application could be local or remote.

In the example of FIG. 1, the flowchart 100 continues to decision point 108 where it is determined whether a resource is requested from a DMZ. For illustrative purposes, it is assumed that the application will request one or more resources. The DMZ may be associated with resources in the container introduced in module 102 or with resources in a different container. If the requested resource is not associated with a DMZ (108—N), then the flowchart 100 continues to module 110 where the requested resource is provided, assuming the resource is available, according to known or convenient techniques, and the flowchart 100 returns to module 106 where execution of the application continues. If, on the other hand, the requested resource is associated with the DMZ (108—Y), then the flowchart 100 continues to decision point 112 where it is determined whether rule-based access is granted to the application for the resource in the DMZ.

If it is determined that rule-based access is granted (112—Y), then the flowchart 100 continues to module 114 where the resource is provided, then the flowchart 100 continues to module 106 where execution of the application continues. If, on the other hand, it is determined that rule-based access is not granted (112—N), then the flowchart 100 continues to module 116 where access to the resource is restricted and to decision point 118 where it is determined whether the application ends. Whether the application ends at this point may depend upon how the application reacts to having access to a resource restricted. For example, the application may end if it does not receive a requested resource and could even "crash" if implementation is not robust. In this case, it would be determined at decision point 118 that the application ends (118—Y) and the flowchart 100 ends. As another example, the application may be able to recover from having access to a resource restricted by requesting an alternative resource, attempting to "rephrase" the resource request with a different request (e.g., after asking a software or human agent to perform an act), or proceeding without the requested resource. In this case, it would be determined at decision point 118 that the application does not end (118—N) and the flowchart 100 continues to module 106 where execution of the application continues.

Figure 2A:
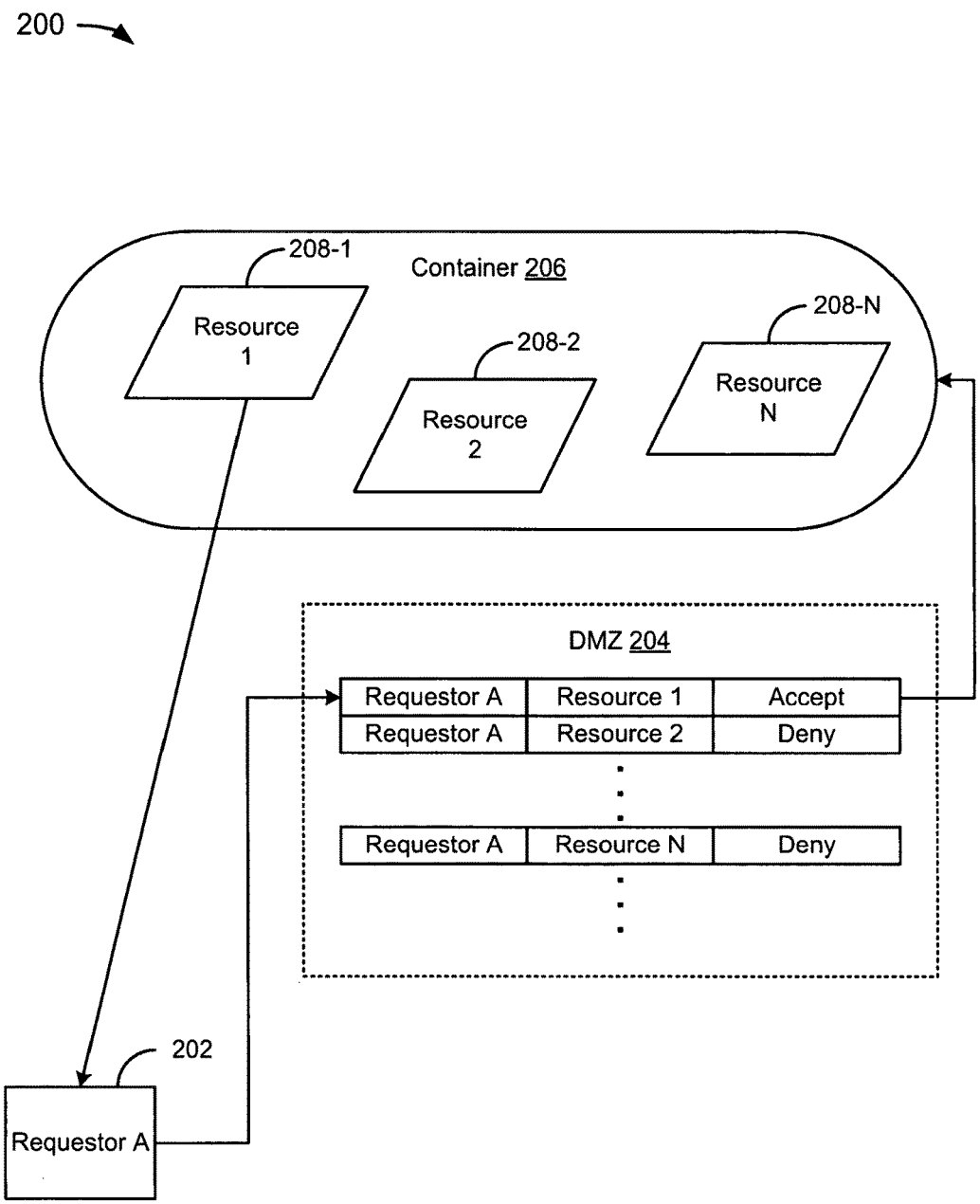
FIGS. 2A and 2B depict conceptual diagrams of an example of a system for rule-based access to resources in a container.
Figure 2B:
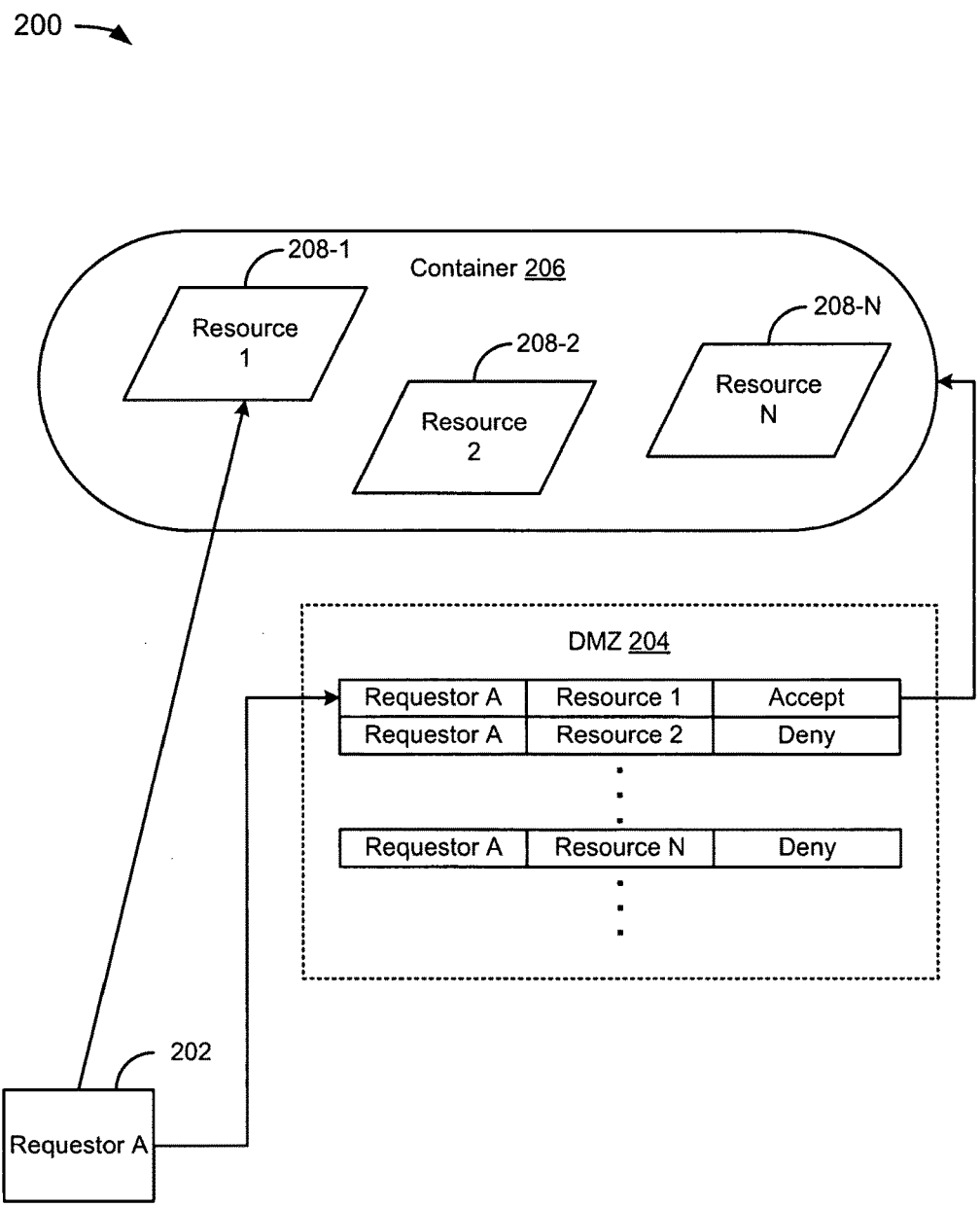

FIGS. 2A and 2B depict conceptual diagrams of an example of a system 200 for rule-based access to resources in a container. In the example of FIGS. 2A and 2B, the system 200 includes a requestor 202, a DMZ 204, and a software container 206. In an embodiment, the requestor 202 is identifiable as a user, a process, or a combination of user and process. The DMZ 204 includes, for illustrative purposes only, a table that correlates the requestor to a resource. Instead of a table, a known or convenient structure could be used to manage access rules. The DMZ may include rules associated with multiple requestors, resources inside the container 206 or another container (not shown) and may have rules other than accept/deny (as shown in the FIGS. 2A and 2B), such as "read-only," "verify," or other rules. The container 206 includes resource 208-1 to 208-N (collectively referred to as resources 208). Resources may include a known or convenient software, firmware, or hardware component. In an embodiment, the resources include software components such as software drivers for driving hardware components. When specifically referring to a container that includes software resources, including software drivers and the like, the container may be referred to as a software container.

In the example of FIG. 2A, the requestor 202 sends a request for, for the purpose of illustration, the resource 208-1 (Resource 1). The request is intercepted or viewed by the DMZ 204, where a rule is checked to ensure that the requestor 202 is allowed access to Resource 1. In the example of FIG. 2A, for the purpose of illustration, the requestor 202 is allowed access to Resource 1. Since the requestor 202 is allowed access, the request is forwarded from the DMZ 204 to the software container 206. It should be noted that, depending upon the embodiment or implementation, the DMZ 204 may or may not actually receive the request. For example, the DMZ could allow the requestor 202 to request the relevant resource directly if rule-based access is allowed. Alternatively, the DMZ may, for example, send a message to the software container 206 (rather than forward the request), indicating that a resource should be provided to the requestor 202. In yet another alternative, requests can be hooked by the DMZ 204, using file hooks. The DMZ 204 can then analyze the request and either allow access to the resource or deny access. There are certain advantages to file hooking, some of which are described later with reference to FIG. 5. In any case, at some point, if rule-based access is allowed, requestor 202 gains access to Resource 1.

FIG. 2A is intended, by the arrow from the resource 208-1 to the requestor 202, to symbolize read access to Resource 1. FIG. 2B is intended, by the arrow from the requestor 202 to the resource 208-1, to symbolize write access to Resource 1. The arrow could also be bi-directional (not shown) to symbolize read/write access to Resource 1. Although Resource 1 is depicted as existing prior to the request, it may be possible, in an embodiment, for the requestor 202 to create a resource and place it into the container 206. A rule may be modified, created, adopted, or otherwise used at the DMZ 204 to allow subsequent access by the requestor 202, access by another requestor (not shown), or some other type of access.

Figure 3:
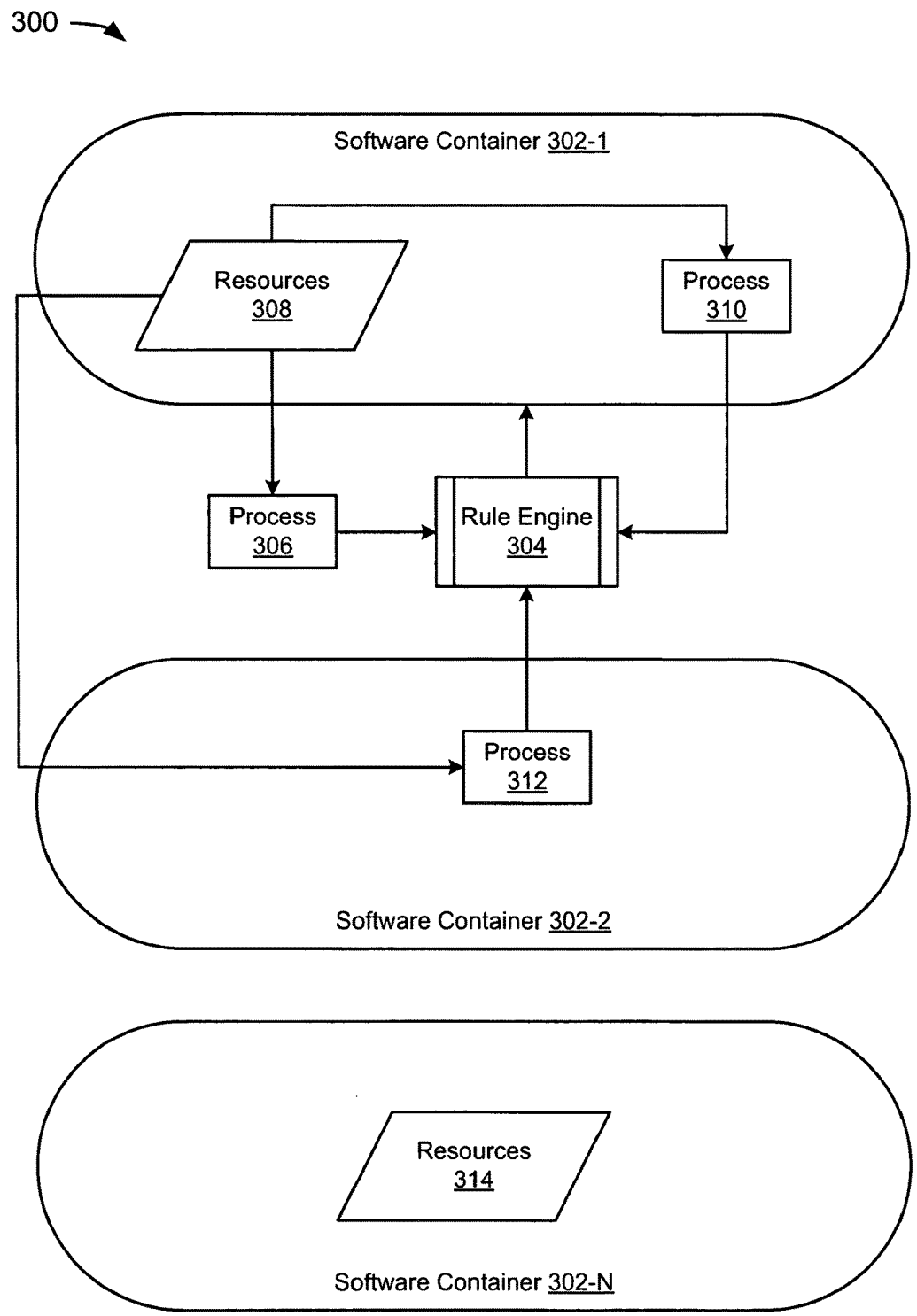
FIG. 3 depicts a conceptual diagram of an example of a system including software containers.

FIG. 3 depicts an example of a system 300 for a partially virtualized environment. In the example of FIG. 3, the system 300 includes a plurality of software containers 302-1 to 302-N (collectively referred to as software containers 302), a rule engine 304, and a process 306. In an embodiment, each of the software containers 302 includes an environment having a set of software and configurations that are to be managed. For illustrative purposes, in the example of FIG. 3, the software container 302-1 includes one or more resources 308 and a process 310, the software container 302-2 includes a process 312, and the software container 302-N includes one or more resources 314. It may be noted that software containers as described herein may include zero or more processes and/or zero or more resources. The software containers 302, if necessary, can create virtual images of resources to manage separate views of container resources. In this way, a software application can be insulated from changes to the runtime environment for other programs. Similarly, other programs can be insulated from changes to the runtime environment made in association with the software application.

In an embodiment, the rule engine 304 is called reactively when software accesses resources from outside or within the container. The rule engine 304 may use, for example, a combination of embedded and configurable rules which can include by way of example but not limitation, file, user, and process access control lists (ACLs), software handlers, and file and resource overlays. Rules may be assigned and managed, for example, per process, per resource (e.g. file, registry, etc.), and per user. In a non-limiting embodiment, a main process and child processes of a software application may be assigned the same set of rules, which allow these processes full access to the application resources. Alternatively, processes, especially those executing outside the application's process tree, can be individually assigned rules that allow, restrict, or deny access to individual resources of the application. Same or different users may or may not be allowed to have same or different sets of rules for the same or different applications at the same or different times of usage. These sets of rules may be communicated securely to the user's machine using encryption.

The rule engine 304 may be local or remote with respect to one or more of the software containers 302 (or portions thereof) and/or the process 306. Alternatively, the software containers 302 may include the rule engine 304, either distributively, redundantly, or by having relative global access.

For illustrative purposes, the process 306 is outside of a software container. It may be noted that the process 306 could be local or remote with respect to one or more of the software containers 302 (or portions thereof). It should be noted that, in an embodiment, all local processes are located inside one or more of the software containers 302.

In the example of FIG. 3, the process 306 is depicted as accessing the rule engine 304. For illustrative purposes, the access to the rule engine 304 is represented as a uni-directional arrow from the process 306 to the rule engine 304, which implies the process 306 provides data to the rule engine 304. The rule engine 304 determines whether the data is sufficient to determine that access to the resources 308 is allowed, and sends permission to the software container 302-1, which can allow access to the resources 308.

In the example of FIG. 3, the process 306 is depicted as accessing one or more of the resources 308 that are located within the software container 302-1. For illustrative purposes, access to one or more of the resources 308 is represented as a uni-directional arrow from the resources 308 to the process 306. While this may imply a read access, it should be noted that, depending upon the process, resource, rules, and/or implementation, the access could be read, write, or read/write access.

In operation, the process 306 provides data to the rule engine 304 (e.g., in the form of a request for resources 308), which in turn informs the software container 302-1 that one or more of the resources 308 should be made available to the process 306. This description may be considered a basic generalization for other implementations.

In an example of an implementation, the communications between the rule engine 304 and the process 306 could be interception-based. In such an embodiment, the rule engine 304 may use a file system hook to intercept a request for resources 308 from the process 306. (One example of an implementation of a file system hook is a filter driver.) In this embodiment, the uni-directional arrow from the process 306 to the rule engine 304 represents the interception of a request for the resources 308 from the process 306. Another example of an interception based technique may incorporate a virtual drive, as described in U.S. Pat. No. 6,453,334, issued on Sep. 17, 2002, to Vinson et al., which is incorporated herein by reference. Any known or convenient interception-based technique could potentially be used.

In the example of FIG. 3, the process 310 is located within the software container 302-1, and accesses the resources 308. In an embodiment, the process 310, although it is located within the same container as the resources 308, may be treated as if it were not so located. For example, the process 310 may send a request for resources 308 to (or have the request intercepted by) the rule engine 304, the rule engine 304 informs the software container 302-1, and the software container 302-1 gives the process 310 access to the resources 308. Alternatively, it may be desirable to allow the process 310 access to the resources 308 without utilizing the rule engine 304. For example, anything within the software container 302-1 could be considered "safe." In such an embodiment, the process 310 may be able to access the resources 308 without having the request intercepted, while the process 306 may have requests intercepted and analyzed.

In the example of FIG. 3, the process 312 is located within the software container 302-2, and accesses the resources 308. The access could be as described previously (through the rule engine 304), or the process 312 could be considered "safe" since it is located within a software container 302-2, albeit a different software container than that of the resources 308. In an embodiment, each of the software containers logically includes the rule engine 304. So, the process 312 could have a request intercepted logically within the software container 302-2. It may be desirable to include rules that treat requests for resources that originate from within a software container differently than requests that originate from outside of any software container (such as requests from the process 306). For example, if the process 312 is refused write access to the resources 308, the software container 302-2 may include instructions to copy some or all of the resources 308 into the software container 302-2 for modification by the process 312. It should be noted that even in the case of the process 306, which is logically outside of a software container, resources could be copied for local modification.

Figure 4:
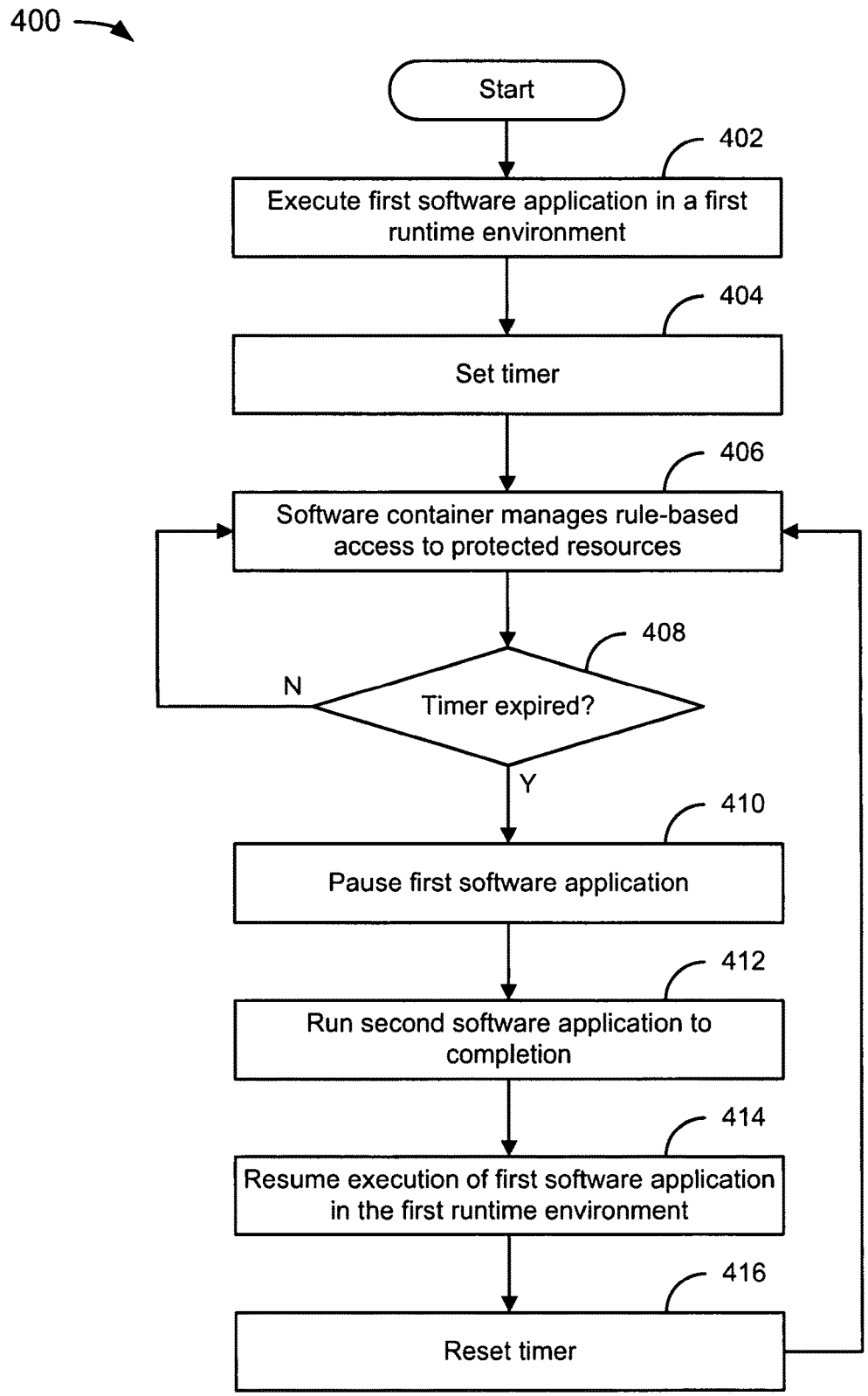
FIG. 4 depicts a flowchart of an example of a method for pausing a software application, running a different software application to completion, and restarting the pause software application.

FIG. 4 depicts a flowchart 400 of an example of a method for pausing a software application, running a different software application to completion, and restarting the pause software application. By using rule-based access management techniques as described herein, the problems associated with pausing a software application to run another software application, such as by making changes to the runtime environment, are reduced or eliminated.

In the example of FIG. 4, the flowchart 400 starts at module 402 where a first software application is executed in a first runtime environment. The flowchart 400 continues to module 404 where a timer is set. Setting the timer is intended to help illustrate the value of using a software container in a specific implementation. The flowchart 400 continues to module 406 where a software container manages rule-based access to protected resources associated with the first software application.

In the example of FIG. 4, the flowchart 400 continues to decision point 408 where it is determined whether the timer has expired. If it is determined that the timer has not expired (408—N), then the flowchart 400 loops from module 406 to decision point 408 until the timer expires. If, on the other hand, it is determined that the timer has expired (408—Y), then the flowchart 400 continues to module 410 where the first software application is paused.

The flowchart 400 continues to module 412 where a second software application is run to completion. In an embodiment, the second software application is run in a second runtime environment that is nearly identical (initially) to the first runtime environment. However, the second software application is unable to make changes to the first runtime environment (unless exceptions are made) for the first software application because the first software application is maintained within a software container. Accordingly, when the second software application ends, the first software application resumes execution in the first runtime environment. It may be noted that in an alternative embodiment the second software application could instead run concurrently with the first software application, but in a second runtime environment.

The flowchart 400 continues to module 414 where execution of the first software application is resumed. The flowchart 400 continues to module 416 where the timer is reset, then the flowchart 400 continues to module 406, as described previously. Using this technique, a computer executing a first application could begin executing a second application periodically (at a frequency that is dependent upon the length of the timer).

In the example of FIG. 4, a timer is the trigger for execution of a second application. However, the trigger could be just about any event. For example, in a game, the trigger could be advancement to a new level, access to a particular file, receiving a particular key-stroke or key-stroke sequence, or some other trigger associated with the game. With enterprise or productivity software, the trigger could be similar, but might also include triggers such as noon (lunchtime), 6:00 (work over), or Friday (payroll) triggers, attempting to access a particular feature or function, or when a file is going to be requested in a streaming context.

A system can freeze an application by telling the Operating System to lock up and pause the application. It may be difficult to freeze very low level (e.g., disk driver) applications. If it becomes necessary to freeze low level applications, the applications can be "virtually" frozen within a software container. Some applications depend upon a system clock, which, if frozen, could cause them to crash. So it may be desirable to maintain an internal clock within a software container that serves as a system clock for internal processes, which can be frozen. Some applications are specially designed for excellent performance. This is relatively common with games, so game designers often use shortcuts and programming techniques on an as-needed basis. These shortcuts make freezing the game even more problematic. Moreover, some games have code that try to prevent interjecting other items into the game, which could make it even worse. Therefore, in particular contexts, it may be desirable to fix quirks that occur frequently (or even infrequently) in programs to make freezing the application work better.

Streaming software applications normally pause when they are being streamed (to wait for download of a required block), so freezing software applications is a relatively straight-forward the techniques described herein. For example, a stream-enabled client shell may capture a runtime environment. So the client shell could be told to hold a block associated with a first stream-enabled software application until a second software application has been executed.

Figure 5:
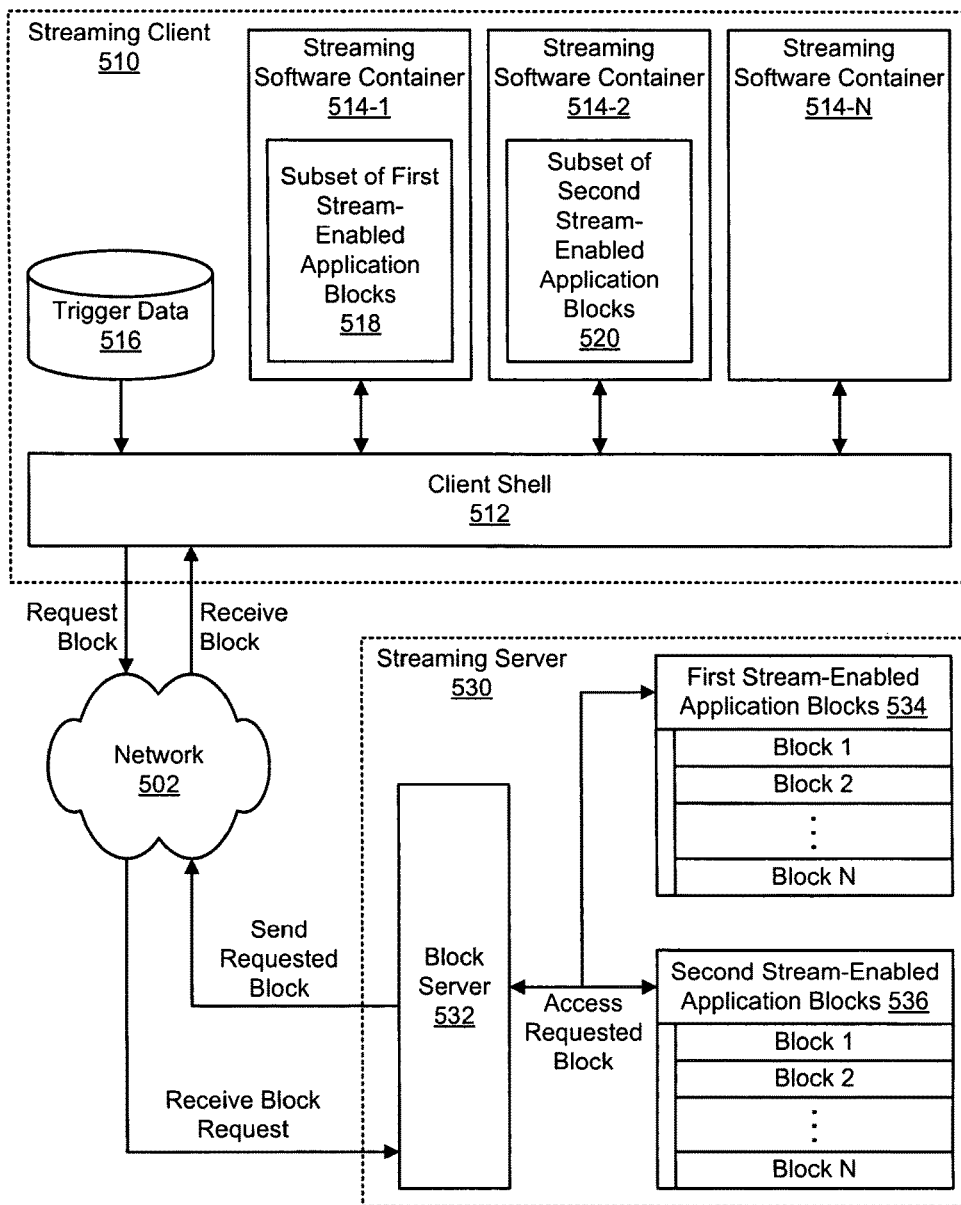
FIG. 5 depicts an example of a system for streaming software in an environment that includes software containers.

FIG. 5 depicts an example of a system 500 for streaming software in an environment that includes software containers. In the example of FIG. 5, the system 500 includes a network 502, a streaming client 510, and a streaming server 530. In operation, the streaming client 510 requests, through the network 502, one or more blocks for streaming from the streaming server 530. The streaming server 530 returns the requested blocks to the streaming client 510.

It may be noted that blocks may be provided to the streaming client 510 without being requested. For example, the streaming server 530 could predictively stream a stream-enabled application to the streaming client 510, such as is described by way of example but not limitation in U.S. patent application Ser. No. 10/988,014, filed Nov. 11, 2004, by DeVries, which is incorporated by reference.

It may be noted that the streaming server 530 could instead be a media device from which blocks are streamed, such as is described by way of example but not limitation in U.S. patent application Ser. No. 11/273,862, filed Jun. 8, 2006, by DeVries et al., which is incorporated by reference. As such, the network 502 could be considered optional, or in the alternative, a known or convenient means for coupling the streaming client 510 to the streaming server 530 could be used.

In the example of FIG. 5, the streaming client 510 includes a client shell 512, streaming software containers 514-1 to 514-N (collectively referred to as streaming software containers 514), and a trigger database 516. The streaming software container 514-1 includes a subset of first stream-enabled application blocks 518, and the streaming software container 514-2 includes a subset of second stream-enabled application blocks 520. In the example of FIG. 5, the streaming server 530 includes a block server 532, first stream-enabled application blocks 534, and second stream-enabled application blocks 536.

In an embodiment, the client shell 512 provides a virtual environment in which stream-enabled applications can run even if they are not entirely downloaded. Stream-enabled applications may be maintained within the streaming software containers 514. This may mean that the virtual environment of the client shell 512, which may include registry overlays, file system overlays, spoofed registries, spoofed directories, spoofed environment variables, and/or other components that serve to virtualize the environment, may be different from the runtime environment associated with one or more of the streaming software containers 514. However, the client shell 512 may not include a virtual environment at all if the virtual environment typically needed for streaming software is contained within each of the streaming software containers 514. Indeed, the client shell 512 could be partially or entirely subsumed by the streaming software containers 514. This is an implementation decision.

In the example of FIG. 5, in operation, a first application associated with the subset of first stream-enabled application blocks 518, is run in the client shell 512. As the first application runs, it may need an additional block that is not included in the subset of first stream-enabled application blocks 518. The streaming client 510, on behalf of the client shell 512, sends a request for the desired block through the network 502 to the streaming server 530. At the streaming server 530, the block server 532 accesses the requested block from the first stream-enabled application blocks 534, and returns the requested block to the streaming client 510. In this way, the first application can continue to run, requesting blocks as needed.

It may be desirable to pause the first application. In the example of FIG. 5, the trigger database 516 is intended to represent the collection of events that may trigger pausing the first application to perform some other action, such as running a second application. The trigger database 516 may include global triggers (such as forced execution of the second application at a pre-determined time), local triggers, and/or application-specific triggers (such as requesting a particular block for a stream-enabled application).

In operation, if the client shell 512 detects an event that is in the trigger database 516, execution of the first application may be suspended. Since the first application is maintained in a software container, the runtime environment of the first application can be substantially maintained. A first block of the second application can then be requested, using the same mechanisms described previously. At the streaming server 530, the block server 532 accesses the requested block from the second stream-enabled application blocks 536 and returns the requested block. The requested block can then be added to the subset of second stream-enabled application blocks 520 of the streaming software container 514-2. It should be noted that one or more of the blocks associated with the second application could be pre-stored in the subset of second stream-enabled application blocks 520. This could occur well in advance (e.g., the blocks could be downloaded at the same time the blocks associated with the first application are downloaded), or on the fly (e.g., a trigger could force a download of blocks associated with the second application, but the first application could be paused later, after a sufficient number of blocks associated with the second application have been downloaded). Moreover, the first application or the second application need not even be stream-enabled. Alternatively, the first application could be a stream-enabled application, but the second application could be streaming media. (Note: Streaming media is actually not a stream-enabled application since the streaming media is not executable). Assuming the second application is maintained in a streaming software container, as depicted in FIG. 5, the second application could be paused while the first application (or some other application) is executed.

Figure 6:
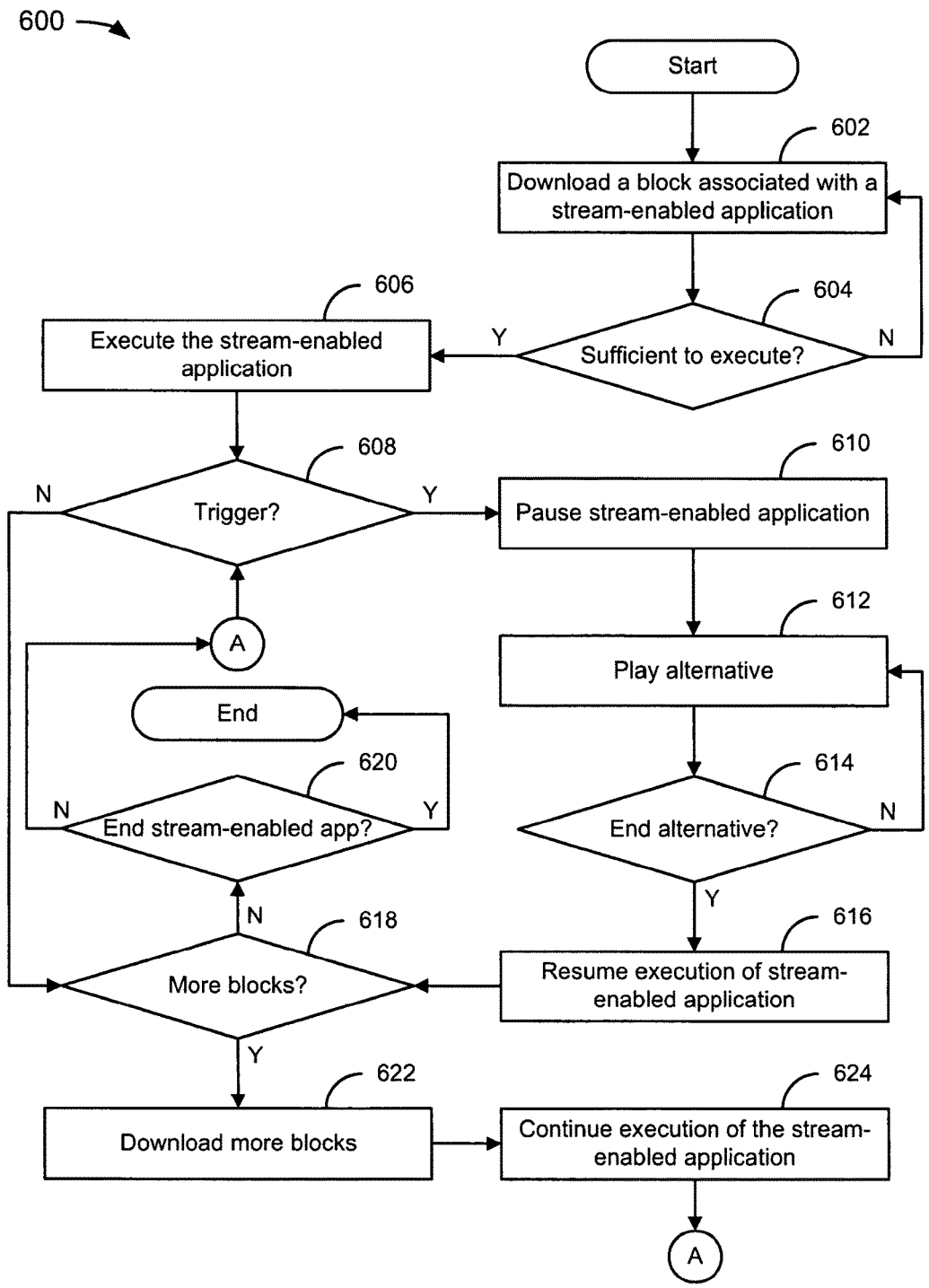
FIG. 6 depicts a flowchart of an example of a method for pausing a stream-enabled application.

FIG. 6 depicts a flowchart 600 of an example of a method for pausing a stream-enabled application. The flowchart 600 starts at module 602 with downloading a block associated with a stream-enabled application. It may be noted that in some streaming software implementations, the first "block" includes registry data, file system data, environment variable data, and/or other data that is used to set up a virtual environment in which a stream-enabled application associated with the first block can be executed. It may or may not be the case that the first block is different from all of the other blocks in that it is required, in that it is a different size, or in some other way. For illustrative purposes, and because it is not necessary for an understanding of the techniques described herein, all blocks are treated equally.

The flowchart 600 continues to decision point 604 where it is determined whether a sufficient number of blocks are available to execute the stream-enabled application. In an embodiment, the first block alone is sufficient. In other embodiments, two or more blocks must be downloaded before the stream-enabled application is executable. It may be noted that a stream-enabled application may be executable after a certain number of blocks have been downloaded in one implementation, but that in another implementation the number of blocks may be more or less. This may be, for example, due to performance issues (it may be desirable to wait for more blocks because if the application is executed early it will run slowly) or due to locally available resources that need not be downloaded.

If it is determined that a sufficient number of blocks have not been downloaded (604—N), then the flowchart 600 continues to module 602, and repeats until a sufficient number of blocks have been downloaded. When it is determined that a sufficient number of blocks have been downloaded (604—Y), the flowchart 600 continues to module 606 where the stream-enabled application is executed. Then the flowchart 600 continues to decision point 608 where it is determined whether a trigger event occurs.

If it is determined that a trigger event occurs (608—Y), then the flowchart 600 continues to module 610 where the stream-enabled application is paused, to module 612 where an alternative is played, and to decision point 614 where it is determined whether the alternative ends. If it is determined that the alternative does not end (614—N), then the flowchart 600 continues to module 612 where the alternative continues to play until it ends. When it is determined that the alternative ends (614—Y), the flowchart continues to module 616 where execution of the stream-enabled application resumes.

If it is determined that a trigger event does not occur (608—N), or if the flowchart 600 continues from module 616, the flowchart 600 continues to decision point 618 where it is determined whether more blocks are needed to run the stream-enabled application. If it is determined that additional blocks are not needed (618—N), the flowchart 600 continues to decision point 620 where it is determined whether the stream-enabled application ends. The flowchart 600 ends if the stream-enabled application ends (608—Y), and returns to decision point 608 if the stream-enabled application does not end (608—N). If it is determined that additional blocks are needed (618—Y), then the flowchart 600 continues to module 622 where additional blocks are downloaded, to module 624 where execution of the stream-enabled application continues, and to decision point 608, as described previously.

Figure 7:
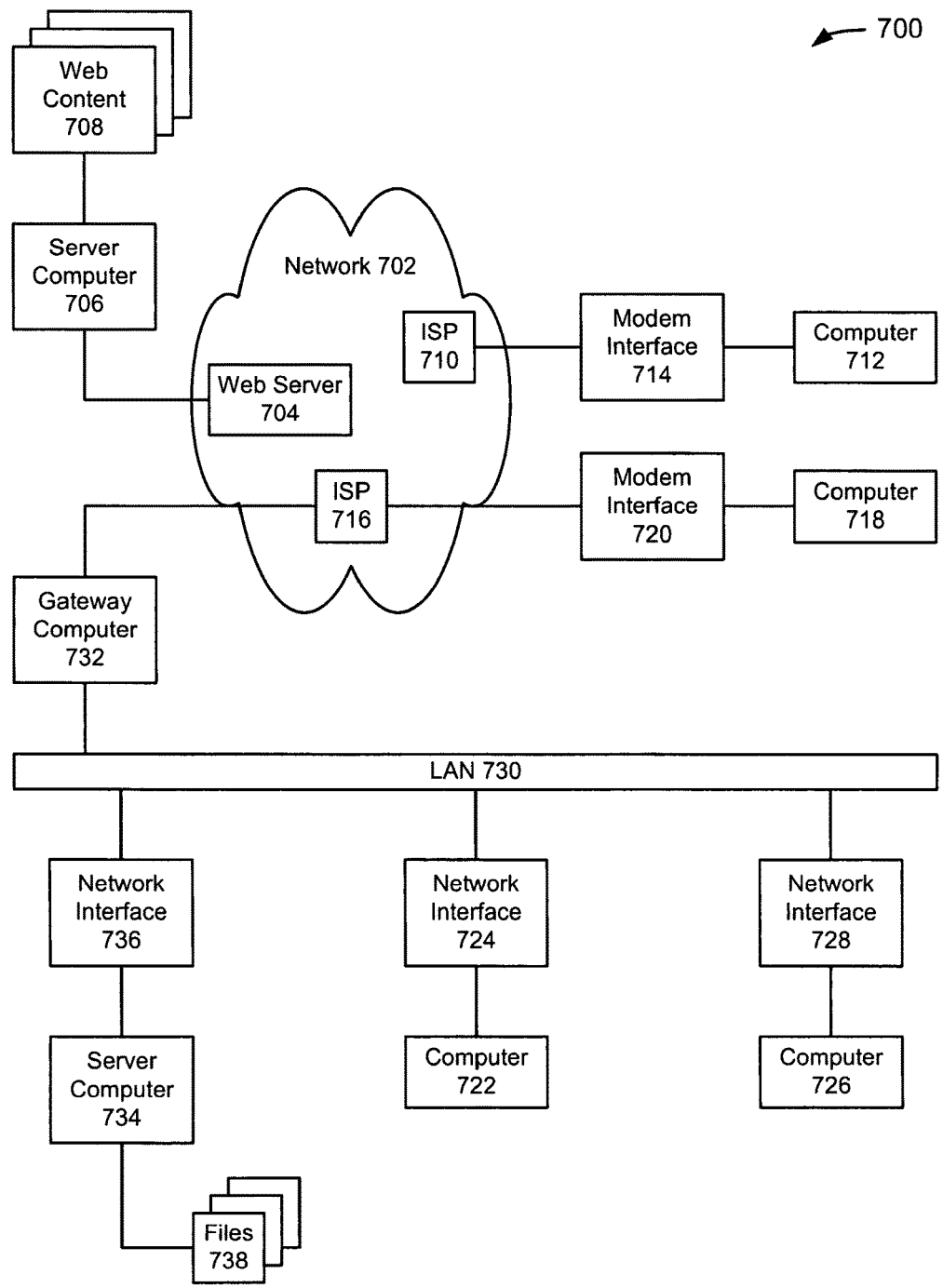
FIG. 7 depicts a system for use with the methods described herein.
Figure 8:
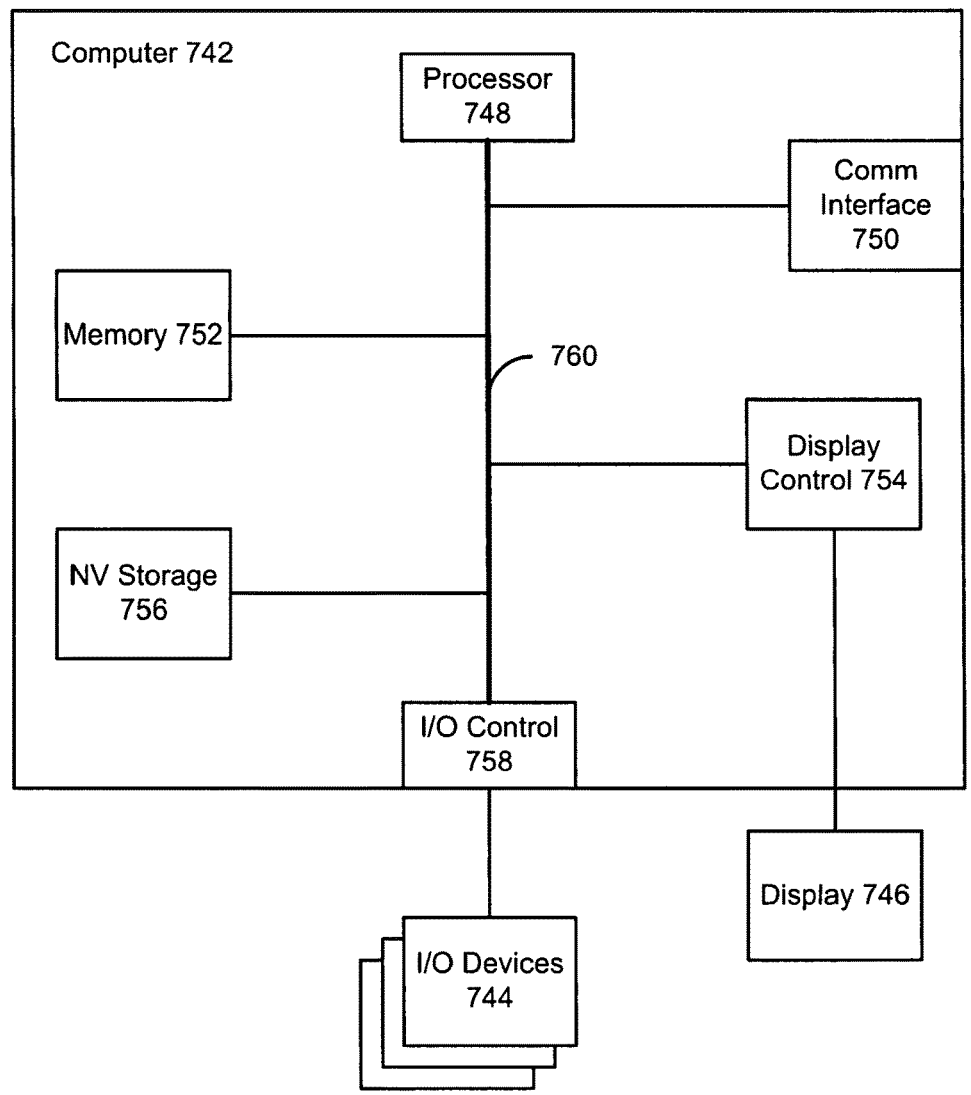
FIG. 8 depicts a device for use with the system of FIG. 7.

The following description of FIGS. 7 and 8 is intended to provide an overview of computer hardware and other operating components suitable for performing techniques described herein, but is not intended to limit the applicable environments. Similarly, the computer hardware and other operating components may be suitable as part of the apparatuses of techniques described herein. The techniques can be implemented on other computer system configurations, including hand-held devices, multiprocessor systems, microprocessor-based or programmable consumer electronics, network PCs, minicomputers, mainframe computers, and the like. The techniques can also be implemented in distributed computing environments where tasks are performed by remote processing devices that are linked through a communications network.

FIG. 7 depicts a networked system 700 that includes several computer systems coupled together through a network 702, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server 704 is typically at least one computer system which operates as a server computer system and is configured to operate with the protocols of the world wide web and is coupled to the Internet. The web server system 704 can be a conventional server computer system. Optionally, the web server 704 can be part of an ISP which provides access to the Internet for client systems. The web server 704 is shown coupled to the server computer system 706 which itself is coupled to web content 708, which can be considered a form of a media database. While two computer systems 704 and 706 are shown in FIG. 7, the web server system 704 and the server computer system 706 can be one computer system having different software components providing the web server functionality and the server functionality provided by the server computer system 706, which will be described further below.

Access to the network 702 is typically provided by Internet service providers (ISPs), such as the ISPs 710 and 716. Users on client systems, such as client computer systems 712, 718, 722, and 726 obtain access to the Internet through the ISPs 710 and 716. Access to the Internet allows users of the client computer systems to exchange information, receive and send e-mails, and view documents, such as documents which have been prepared in the HTML format. These documents are often provided by web servers, such as web server 704, which are referred to as being "on" the Internet. Often these web servers are provided by the ISPs, such as ISP 710, although a computer system can be set up and connected to the Internet without that system also being an ISP.

Client computer systems 712, 718, 722, and 726 can each, with the appropriate web browsing software, view HTML pages provided by the web server 704. The ISP 710 provides Internet connectivity to the client computer system 712 through the modem interface 714, which can be considered part of the client computer system 712. The client computer system can be a personal computer system, a network computer, a web TV system, or other computer system.

While FIG. 7 shows the modem interface 714 generically as a "modem," the interface can be an analog modem, isdn modem, cable modem, satellite transmission interface (e.g. "direct PC"), or other interface for coupling a computer system to other computer systems.

Similar to the ISP 714, the ISP 716 provides Internet connectivity for client systems 718, 722, and 726, although as shown in FIG. 7, the connections are not the same for these three computer systems. Client computer system 718 is coupled through a modem interface 720 while client computer systems 722 and 726 are part of a LAN 730.

Client computer systems 722 and 726 are coupled to the LAN 730 through network interfaces 724 and 728, which can be Ethernet network or other network interfaces. The LAN 730 is also coupled to a gateway computer system 732 which can provide firewall and other Internet-related services for the local area network. This gateway computer system 732 is coupled to the ISP 716 to provide Internet connectivity to the client computer systems 722 and 726. The gateway computer system 732 can be a conventional server computer system.

Alternatively, a server computer system 734 can be directly coupled to the LAN 730 through a network interface 736 to provide files 738 and other services to the clients 722 and 726, without the need to connect to the Internet through the gateway system 732.

FIG. 8 depicts a computer system 740 for use in the system 700 (FIG. 7). The computer system 740 may be a conventional computer system that can be used as a client computer system or a server computer system or as a web server system. Such a computer system can be used to perform many of the functions of an Internet service provider, such as ISP 710 (FIG. 7).

In the example of FIG. 8, the computer system 740 includes a computer 742, I/O devices 744, and a display device 746. The computer 742 includes a processor 748, a communications interface 750, memory 752, display controller 754, non-volatile storage 756, and I/O controller 758. The computer system 740 may be couple to or include the I/O devices 744 and display device 746.

The computer 742 interfaces to external systems through the communications interface 750, which may include a modem or network interface. It will be appreciated that the communications interface 750 can be considered to be part of the computer system 740 or a part of the computer 742. The communications interface can be an analog modem, isdn modem, cable modem, token ring interface, satellite transmission interface (e.g. "direct PC"), or other interfaces for coupling a computer system to other computer systems.

The processor 748 may be, for example, a conventional microprocessor such as an Intel Pentium microprocessor or Motorola power PC microprocessor. The memory 752 is coupled to the processor 748 by a bus 760. The memory 752 can be dynamic random access memory (DRAM) and can also include static ram (SRAM). The bus 760 couples the processor 748 to the memory 752, also to the non-volatile storage 756, to the display controller 754, and to the I/O controller 758.

The I/O devices 744 can include a keyboard, disk drives, printers, a scanner, and other input and output devices, including a mouse or other pointing device. The display controller 754 may control in the conventional manner a display on the display device 746, which can be, for example, a cathode ray tube (CRT) or liquid crystal display (LCD). The display controller 754 and the I/O controller 758 can be implemented with conventional well known technology.

The non-volatile storage 756 is often a magnetic hard disk, an optical disk, or another form of storage for large amounts of data. Some of this data is often written, by a direct memory access process, into memory 752 during execution of software in the computer 742. One of skill in the art will immediately recognize that the terms "machine-readable medium" or "computer-readable medium" includes any type of storage device that is accessible by the processor 748 and also encompasses a carrier wave that encodes a data signal.

Objects, methods, inline caches, cache states and other object-oriented components may be stored in the non-volatile storage 756, or written into memory 752 during execution of, for example, an object-oriented software program.

The computer system 740 is one example of many possible computer systems which have different architectures. For example, personal computers based on an Intel microprocessor often have multiple buses, one of which can be an I/O bus for the peripherals and one that directly connects the processor 748 and the memory 752 (often referred to as a memory bus). The buses are connected together through bridge components that perform any necessary translation due to differing bus protocols.

Network computers are another type of computer system that can be used. Network computers do not usually include a hard disk or other mass storage, and the executable programs are loaded from a network connection into the memory 752 for execution by the processor 748. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 740 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 756 and causes the processor 748 to execute the various acts required by the operating system to input and output data and to store data in memory, including storing files on the non-volatile storage 756.

Figure 9:
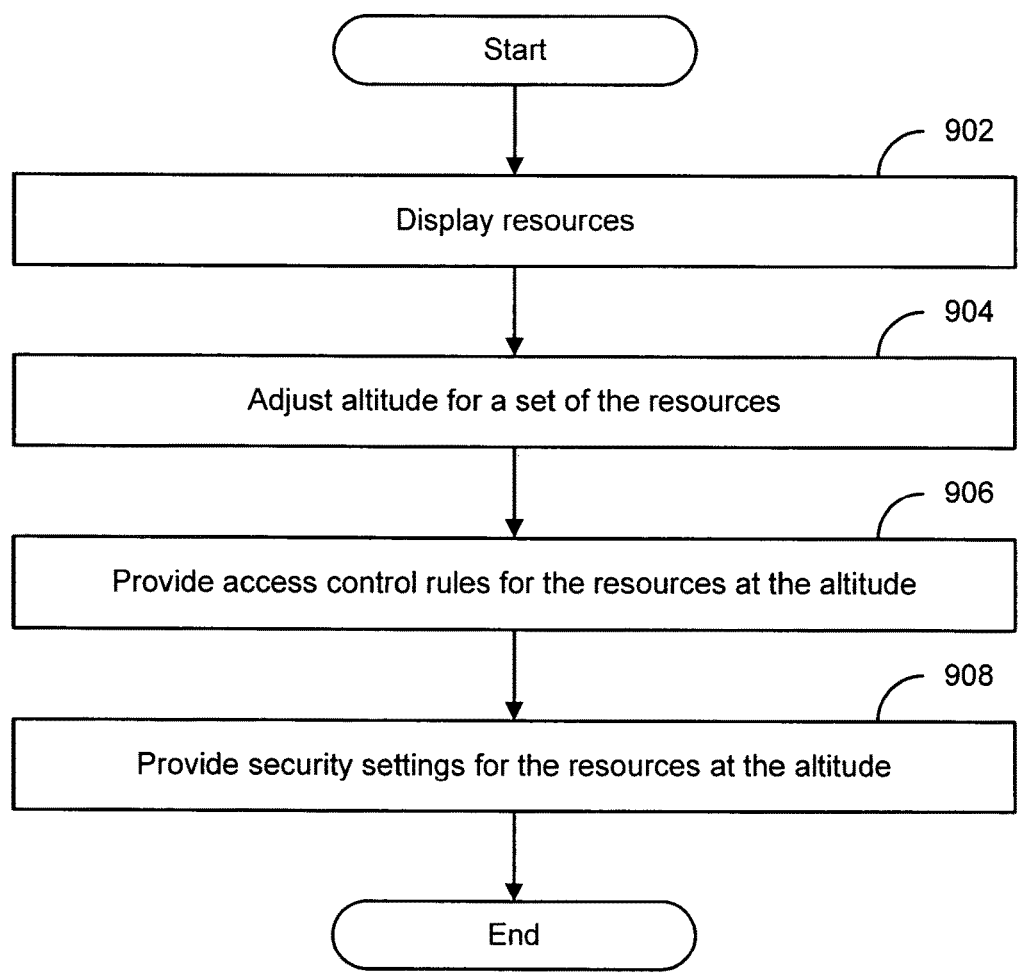
FIG. 9 depicts a flowchart of an example of a method for setting rules in association with altitude.

FIG. 9 depicts a flowchart 900 of an example of a method for setting rules in association with altitude. In the example of FIG. 9, the flowchart 900 starts at module 902 where resources are displayed. The resources may be displayed in a user interface (UI) or a graphical UI (GUI). Resources may include files and registry keys. Environment variables are, in some cases, treated much like resources. In general, in this paper, environment variables are only explicitly distinguished from resources when a distinction is required or desired. Each resource in the display has associated parameters that are also displayed, such as an altitude, access control rules for the altitude, and security settings.

In the example of FIG. 9, the flowchart 900 continues to module 904 where altitude for a set of the resources are adjusted. Initially, resources may have a default altitude value, such as 0, the highest altitude (which can be practically any number, though, for illustrative simplicity, we assume the number in any given implementation will be a whole number), or some number in between. By adjusting the altitude of a resource, the resource is tuned at a particular altitude. For example, if the default altitude is 0, it may be desirable to adjust the altitude of the resource to some higher, more secure level.

In the example of FIG. 9, the flowchart 900 continues to module 906 where altitude access control rules are provided at the altitude selected for the resources. The access control rules may be provided as a default value, and the access control rules may be adjusted from the default value. Access control rules may vary depending upon the implementation or embodiment of a particular system, and may include, by way of example but not limitation, accept, pause, or pass through. These access control types are described later with reference to FIG. 11.

In the example of FIG. 9, the flowchart 900 continues to module 908 where security settings are provided for each resource at the altitude. The security settings may be provided as a default value, and the security settings may be adjusted from the default value. Security settings may include, by way of example but not limitation, find, read, or write settings. There may be other settings as well, such as modify, but modify could be considered to be a subset of write.

In the example of FIG. 9, the flowchart 900 ends after a set of the resources are put on a particular altitude, and the access control rules and security settings are adjusted at that altitude, assuming the defaults are not accepted. In this way, a program may or may not have resources at more than one altitude.

Figure 10:
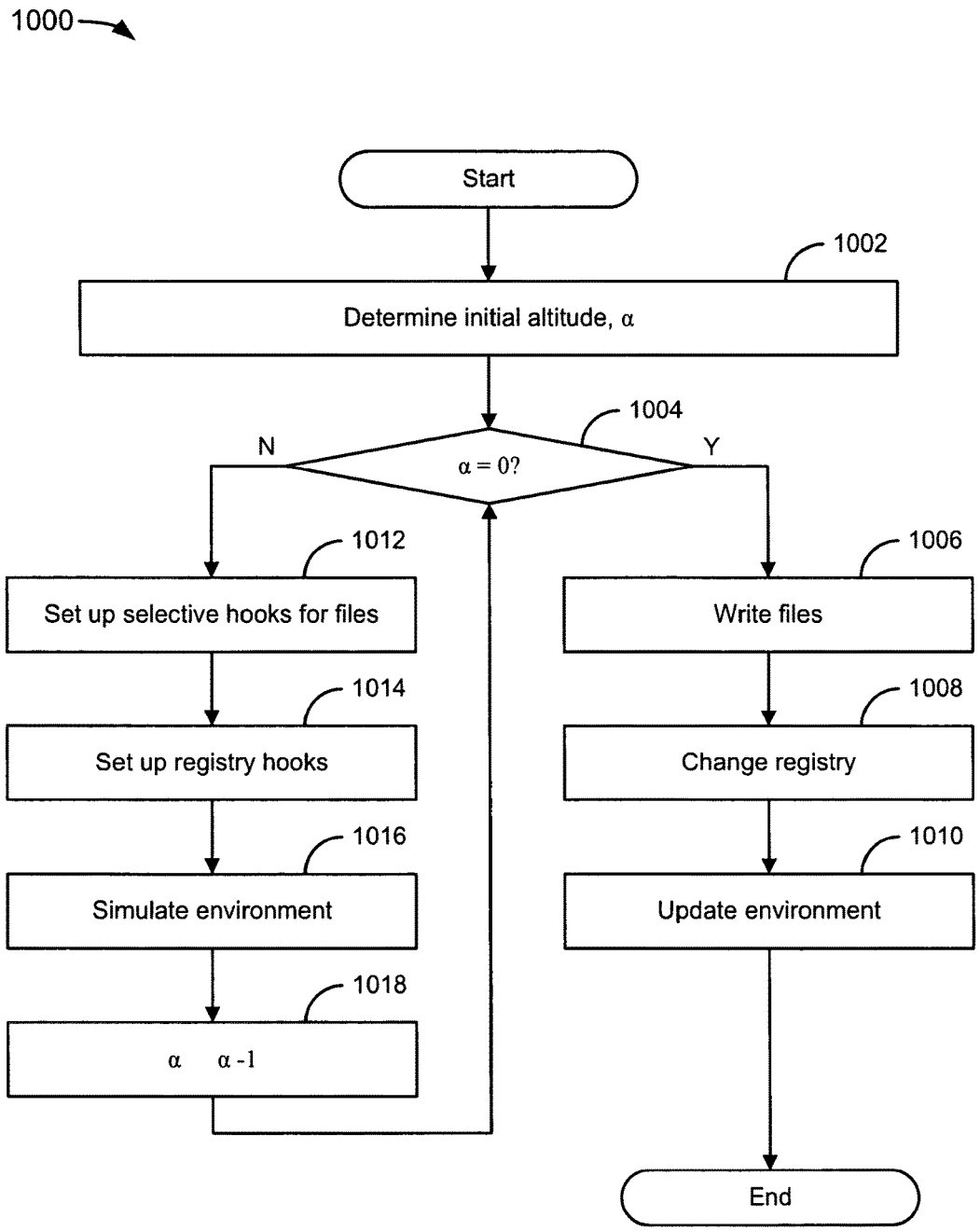
FIG. 10 depicts a flowchart of an example of a method for implementing rules at altitudes of a multi-altitude system.

FIG. 10 depicts a flowchart 1000 of an example of a method for implementing rules at altitudes of a multi-altitude system. In the example of FIG. 10, the flowchart 1000 starts at module 1002, where an initial altitude is determined. For illustrative purposes, the initial altitude is assumed to be the highest altitude implemented on a system. Depending upon the implementation, the initial value altitude could be started at some altitude lower than the highest altitude, such as if, for example, a program being implemented has no resources in the highest altitude. In any case, the flowchart 1000 will logically work, regardless of the actual initial altitude, if it is assumed the initial altitude is the highest altitude.

In the example of FIG. 10, the flowchart 1000 continues to decision point 1004 where it is determined whether the altitude is 0. For illustrative purposes, altitude 0 is assumed to be the lowest (e.g., physical or hardware) altitude. It may be noted that a standard file system is equivalent to a system that has only altitude 0. Therefore, adjusting the system to include a new program is accomplished in a conventional manner, as described in modules 1006-1010.

If it is determined that the altitude is 0 (1004—Y), then the flowchart 1000 continues to module 1006 where files are written to the system, to module 1008 where the registry is changed appropriately, and to module 1010 where the environment is updated. Updating the environment typically involves setting environment variables, and may include other known or convenient processes or settings. Having installed or virtually installed a program, the flowchart 1000 ends.

If, on the other hand, it is determined that the altitude is not 0 (1004—N), then the flowchart 100 continues to module 1012 where selective hooks are set up for files. Advantageously, the hooks are selective depending upon the altitude, resource, and requestor. For example, a requestor may have access to a resource at a given altitude, but not at some other altitude. Or a resource may only allow certain types of access at a given altitude, regardless of requestor ID.

In the example of FIG. 10, the flowchart 1000 continues to module 1014 where registry hooks are set up. Registry hooks may be useful when virtualizing or streaming a software application. Essentially, you can "trick" a system into believing that an application is installed even when it is not.

In the example of FIG. 10, the flowchart 1000 continues to module 1016 where an environment is simulated. Although this may involve setting environment variables, the environment variables are set only at the current altitude. Thus, the environment variables may be referred to as altitude-specific environment variables, or, more generally, simulated or virtual environment variables.

In the example of FIG. 10, the flowchart 1000 continues to module 1018 where the altitude is decremented. Then the flowchart 1000 continues to decision point 1004 as described previously, and continues to loop until altitude 0 is reached.

Advantageously, the method of FIG. 10 can be used to implement resources, or to update resources. For example, if a patch for a program is needed, the patch may implement hooks and environment variables on an as-needed basis. Also, resources can be dynamically lowered in altitude in response to particular stimuli. For example, a demo program could be virtually installed on a machine, enabling sandboxed operation then, when a user purchases the program, the program could be dropped in altitude to 0 or some other altitude. Advantageously, lowering the altitude need not involve additional downloads, and can be accomplished with relative speed. Lowering the altitude of resources may be referred to as a dynamic altitude change.

Figure 11:
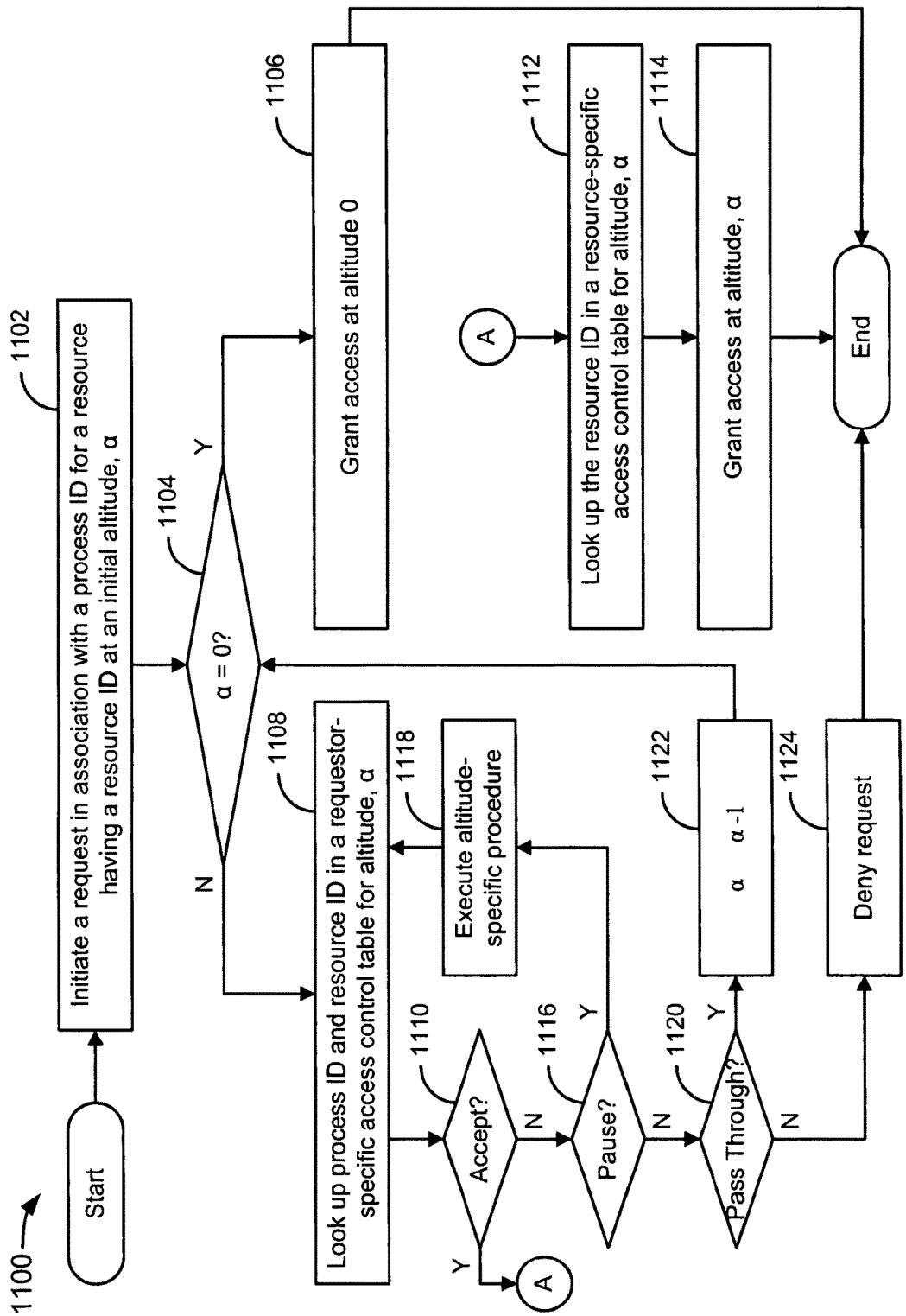
FIG. 11 depicts a flowchart of an example of a method for responding to a request for a resource in a multi-altitude system.

FIG. 11 depicts a flowchart 1100 of an example of a method for responding to a request for a resource in a multi-altitude system. In the example of FIG. 11, the flowchart 1100 starts at module 1102 where a request is initiated in association with a process ID for a resource having a resource ID at an initial altitude. In a non-limiting embodiment, the request "enters" the highest altitude and, depending upon the access controls at the altitude, is disposed of or passed along to a lower altitude.

In the example of FIG. 11, the flowchart 1100 continues to decision point 1104 where it is determined whether the altitude is 0. Although initially this will not be the case, if it is determined that the altitude is 0 (1004—Y), the flowchart 1100 continues to module 1106 where access is granted at altitude 0. Thus, in those cases where the request is not disposed of at a higher level, the resource will be granted at the lowest level. Then the flowchart 1100 ends, having granted access to the resource at altitude 0.

If, on the other hand, it is determined that the altitude is not 0 (1104—N), the flowchart 1100 continues to module 1108 where a process ID and resource ID is looked up in a requestor-specific access control table for the altitude. In an embodiment, each altitude has an associated selective hook table that may include the requestor-specific access control table. The process ID should uniquely identify a process running on or through a local machine. The resource ID should uniquely identify a resource in a known or convenient manner. The process ID, resource ID, and altitude, considered together, are associated with an access control for the resource.

In the example of FIG. 11, the flowchart 1100 continues to decision point 1110 where it is determined whether the access control is "accept." If it is determined that the access control associated with the request is "accept" (1110—Y), the flowchart 1100 continues to module 1112 where the resource ID is looked up in a resource-specific access control table for the altitude. The resource-specific access control table may also be considered part of the selective hook table. The resource-specific access control table has requestor-agnostic security rules for each resource. For example, some resources at the given altitude may grant find access (allowing a requestor to know that the resource exists, and perhaps where, but not be able to access the resource itself), read-only access, or write access. Then the flowchart 1100 continues to module 1114 where the appropriate access is granted at the altitude, and the flowchart 1100 ends, having granted the appropriate access to a resource for a request that was accepted.

If, on the other hand, it is determined that the access control associated with the request is not "accept" (1110—N), the flowchart 1100 continues to decision point 1116 where it is determined whether the access control is "pause." If it is determined that the access control is "pause" (1116—Y), the flowchart 1100 continues to module 1118 where an altitude-specific procedure is executed. Advantageously, this may enable the insertion of ads, intermissions, or other interruptions in a running program. If, on the other hand, it is determined that the access control is not "pause" (1116—N), the flowchart 1100 continues to decision point 1120 where it is determined whether the access control is "pass through."

If it is determined that the access control is "pass through" (1120—Y), the flowchart 1100 continues to module 1122 where the altitude is decremented, then the flowchart 1100 continues to decision point 1104 as described previously. In this way, access control may be checked at a lower altitude. Since lower altitudes are increasingly more public, this may eventually result in a granting of access, as described previously. In the example of FIG. 11, only a few access controls are described. If none of the access controls are granted, then the flowchart 1100 continues to module 1124 where the request is denied, and the flowchart 1100 ends having refused to grant access to the requested resource. It may be noted that "deny" may also be an access control, and in any case is effectively an access control.

Figure 12:
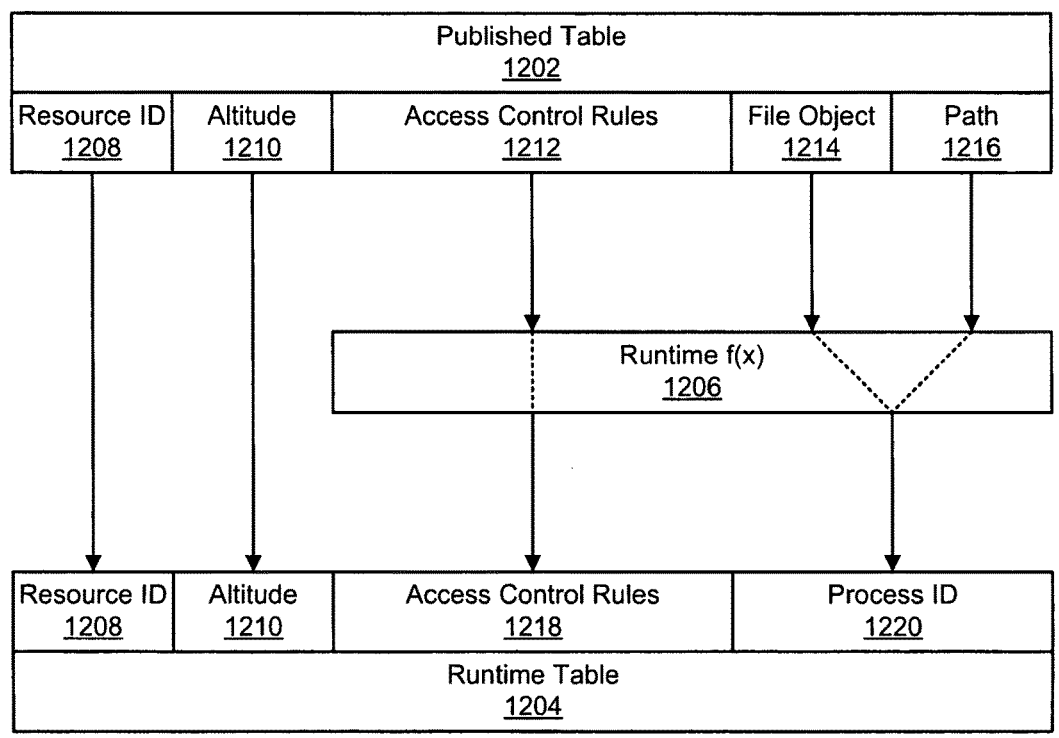
FIG. 12 depicts a conceptual diagram illustrating how a published access control table is used to create a runtime access control table.

FIG. 12 depicts a conceptual diagram 1200 illustrating how a published access control table is used to create a runtime access control table. The diagram 1200 includes a published table 1202, a runtime table 1204, and a runtime function 1206. The published table 1202 includes a resource ID 1208, an altitude 1210, access control rules 1212, a file object 1214, a path 1216. The runtime table 1204 includes the resource ID 1208, the altitude 1210, a process ID 1218, and access control rules 1220.

During runtime, the runtime function 1206 builds the runtime table 1204 from the published table 1202 and, typically, other data. In the example of FIG. 12, the resource ID 1208 and the altitude 1210 are represented in both the published table 1202 and the runtime table 1204. The access control rules 1212 (of the published table 1202) and the access control rules 1218 (of the runtime table 1204), however, may be different. The file object 1214 and the path 1216 are used to identify whether a given process ID is for an applicable application. For example, a company that provides virtualized applications for a computing device may only provide access control for programs with which it is associated or that it is providing to the computing device.

In an embodiment, the access control rules 1212 and the access control rules 1218 are the same if the process ID 1220 is associated with an applicable application. However, if the process ID is not associated with an applicable application, the access control rules may be set to "pass through" or some other default access control rule.

In a system that includes altitudes, the various altitudes may represent any of a number of different security levels. For example, in a two-altitude system, altitude 0 may represent the physical layer and altitude 1 may represent a virtualization layer. In a three-altitude system, altitude 0 may represent the physical layer, altitude 1 a public layer (partially sandboxed), and altitude 2 a private layer (fully sandboxed). In this implementation, the public altitude may be referred to as an "integrated" layer, and the private altitude may be referred to as an "isolated" layer. Other implementations may include an ad altitude, an emulation altitude, or some other altitude.

Advantageously, an ad altitude may capture requests as they pass from a higher altitude toward a lower altitude, and pause the request long enough to play an ad. An emulation layer may capture requests associated with, for example, a Mac (on a PC) and dispose of the request on the emulation layer. It should be noted that these layers can be integrated into the system as a whole, right down to the physical layer.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described herein may relate to apparatus for performing the operations. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

Terms and examples described above serve illustrative purposes only and are not intended to be limiting. As used herein, the term "embodiment" means an embodiment that serves to illustrate by way of example but not limitation.

It will be appreciated to those skilled in the art that the preceding examples and embodiments are exemplary and not limiting to the scope of the invention. It is intended that all permutations, enhancements, equivalents, and improvements thereto that are apparent to those skilled in the art upon a reading of the specification and a study of the drawings are included within the true spirit and scope of the invention. It is therefore intended that the following appended claims include all such modifications, permutations and equivalents as fall within the true spirit and scope of the present invention.

We claim:

1. A method comprising:
   receiving, at a client device, a portion of a streaming software application executing at a remote location in a streaming software container;
   executing the streaming software application virtualized at the client device using the portion of the streaming software application;
   generating, at the client device, a request for an other portion of the streaming software application based on user interaction with the executing of the streaming software application at the client device using the portion of the streaming software application;
   sending the request for the other portion of the streaming software application to the remote location;
   intercepting the request for the other portion of the streaming software application at a DMZ;
   determining if the request for the other portion of the streaming software application is associated with the DMZ;
   if it is determined that the request for the other portion of the streaming software application in unaffiliated with the DMZ:
      determining if rule-based access to the other portion of the streaming software application can be provided to the client device according to rule-based access associated with the client device;
   providing the other portion of the streaming software application to the client device if it is determined that the rule-based access indicates the other portion of the streaming software application can be provided to the client device;
   receiving the other portion of the streaming software application from the remote location, the other portion of the streaming software application specifically retrieved according to the continued execution of the streaming software application in the streaming software container based on the request for the other portion of the streaming software application;
   continuing execution of the streaming software application virtualized at the client device using the other portion of the streaming software application received from the remote location.

2. The method of claim 1, wherein the portion of the streaming software application is a jumpstart partial used to begin execution of the streaming software application virtualized at the client device.

3. The method of claim 1, wherein the streaming software container is a protected and non-integrated environment that prevents public viewing of resources of the streaming software application.

4. The method of claim 1, wherein the streaming software container is open and allows public viewing of resources of the streaming software application.

5. The method of claim 1, further comprising:
   determining a runtime model to use in executing the streaming software application in the streaming software container;
   running the streaming software application in the streaming software container based on the request for the other portion of the streaming software application and according to the determined runtime model to retrieve the other portion of the streaming software application.

6. The method of claim 1, wherein the streaming software application is uniquely associated with the streaming software container.

7. The method of claim 1, further comprising:
   determining a modification level to the other portion of the streaming software application the client device has according to rule-based access rights associated with the client device and the streaming software application;
   modifying the other portion of the streaming software application based on the modification level the client device has according to the rule-based access rights.

8. A system comprising:
   at least one processor and memory configured to store instructions to instruct the at least one processor to:
      receive, at a client device, a portion of a streaming software application executing at a remote location in a streaming software container;
      execute the streaming software application virtualized at the client device using the portion of the streaming software application;
      generate, at the client device, a request for an other portion of the streaming software application based on user interaction with the executing of the streaming software application at the client device using the portion of the streaming software application;
      send the request for the other portion of the streaming software application to the remote location;
      intercept the request for the other portion of the streaming software application at a DMZ;
      determine if the request for the other portion of the streaming software application is associated with the DMZ;
      determine if rule-based access to the other portion of the streaming software application can be provided to the client device according to rule-based access associated with the client device, if it is determined that the request for the other portion of the streaming software application in unaffiliated with the DMZ;
      provide the other portion of the streaming software application to the client device if it is determined that the rule-based access indicates the other portion of the streaming software application can be provided to the client device;
receive the other portion of the streaming software application from the remote location, the other portion of the streaming software application specifically retrieved according to the continued execution of the streaming software application in the streaming software container based on the request for the other portion of the streaming software application;
continue execution of the streaming software application virtualized at the client device using the other portion of the streaming software application received from the remote location.

9. The system of claim 8, wherein the portion of the streaming software application is a jumpstart partial used to begin execution of the streaming software application virtualized at the client device.

10. The system of claim 8, wherein the streaming software container is a protected and non-integrated environment that prevents public viewing of resources of the streaming software application.

11. The system of claim 8, wherein the streaming software container is open and allows public viewing of resources of the streaming software application.

12. The system of claim 8, further comprising a streaming server configured to:
determine a runtime model to use in executing the streaming software application in the streaming software container;
run the streaming software application in the streaming software container based on the request for the other portion of the streaming software application and according to the determined runtime model to retrieve the other portion of the streaming software application.

13. The system of claim 8, wherein the streaming software application is uniquely associated with the streaming software container.

14. A system comprising:
at least one hardware processor:
memory storing instructions configured to be executed by the at least one hardware processor to implement;
means for receiving, at a client device, a portion of a streaming software application executing at a remote location in a streaming software container;
means for executing the streaming software application virtualized at the client device using the portion of the streaming software application;
means for generating, at the client device, a request for an other portion of the streaming software application based on user interaction with the executing of the streaming software application at the client device using the portion of the streaming software application;
means for sending the request for the other portion of the streaming software application to the remote location;
means for intercepting the request for the other portion of the streaming software application at a DMZ;
means for determining if the request for the other portion of the streaming software application is associated with the DMZ;
means for determining if rule-based access to the other portion of the streaming software application can be provided to the client device according to rule-based access associated with the client device, if it is determined that the request for the other portion of the streaming software application in unaffiliated with the DMZ;
means for providing the other portion of the streaming software application to the client device if it is determined that the rule-based access indicates the other portion of the streaming software application can be provided to the client device;
means for receiving the other portion of the streaming software application from the remote location, the other portion of the streaming software application specifically retrieved according to the continued execution of the streaming software application in the streaming software container based on the request for the other portion of the streaming software application;
means for continuing execution of the streaming software application virtualized at the client device using the other portion of the streaming software application received from the remote location.

* * * * *